United States Patent
Golitschek Edler von Elbwart et al.

(10) Patent No.: US 9,768,942 B2
(45) Date of Patent: Sep. 19, 2017

(54) FLEXIBLE TDD UPLINK-DOWNLINK CONFIGURATION WITH FLEXIBLE SUBFRAMES

(71) Applicant: Panasonic Intellectual Property Corporation of America, Torrance, CA (US)

(72) Inventors: Alexander Golitschek Edler von Elbwart, Langen (DE); Hidetoshi Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 170 days.

(21) Appl. No.: 14/888,333

(22) PCT Filed: May 7, 2014

(86) PCT No.: PCT/EP2014/059325
§ 371 (c)(1),
(2) Date: Oct. 30, 2015

(87) PCT Pub. No.: WO2014/180896
PCT Pub. Date: Nov. 13, 2014

(65) Prior Publication Data
US 2016/0080133 A1    Mar. 17, 2016

(30) Foreign Application Priority Data
May 8, 2013   (EP) .................................... 13002457

(51) Int. Cl.
*H04J 3/00*   (2006.01)
*H04L 5/14*   (2006.01)
(Continued)

(52) U.S. Cl.
CPC ............. *H04L 5/14* (2013.01); *H04B 7/2656* (2013.01); *H04L 1/1854* (2013.01);
(Continued)

(58) Field of Classification Search
CPC ....... H04L 5/14; H04L 5/1469; H04L 1/1854; H04W 72/0406; H04W 72/0446; H04W 76/048; H04B 7/2656
(Continued)

(56) References Cited

U.S. PATENT DOCUMENTS 9,615,358 B2 *  4/2017  Nguyen ............ H04W 72/0446
9,680,581 B2 *  6/2017  Song .................... H04B 17/309
(Continued)

FOREIGN PATENT DOCUMENTS

EP       2 498 419 A2     9/2012

OTHER PUBLICATIONS

3GPP TS 25.331 V6.7.0, Sep. 2005, 1166 pages.
(Continued)

*Primary Examiner* — Thai Hoang
(74) *Attorney, Agent, or Firm* — Seed IP Law Group LLP

(57) ABSTRACT

The invention relates to a method for communicating based on a flexible TDD configuration by introducing flexible subframes, selectively usable as a downlink or uplink subframe in a manner avoids a transition from a (non-)flexible downlink subframe n to a (non-)flexible uplink subframe n+1. Furthermore, the invention allows reducing the number and types of uplink transmissions that would be pending for a flexible subframe, by defining HARQ uplink feedback timings based on the HARQ uplink feedback timings for the static TDD configurations such that HARQ uplink feedback is never transmitted in a flexible subframe, and also by releasing configurations for periodic uplink transmissions such as, SPS-scheduled uplink data transmissions, periodic
(Continued)

CSI report, uplink sounding, random access, and scheduling requests.

18 Claims, 10 Drawing Sheets

(51) Int. Cl.
    *H04B 7/26*     (2006.01)
    *H04W 72/04*     (2009.01)
    *H04L 1/18*     (2006.01)
    *H04W 76/04*     (2009.01)
    *H04L 5/00*     (2006.01)

(52) U.S. Cl.
CPC ....... *H04L 5/1469* (2013.01); *H04W 72/0406* (2013.01); *H04W 72/0446* (2013.01); *H04W 76/048* (2013.01); *H04L 1/1896* (2013.01); *H04L 5/0007* (2013.01); *H04L 5/0055* (2013.01)

(58) Field of Classification Search
USPC ........................................................ 370/280
See application file for complete search history.

(56) References Cited

U.S. PATENT DOCUMENTS

| | | | |
|---|---|---|---|
| 2011/0176461 A1* | 7/2011 | Astely | H04B 7/2656 370/280 |
| 2011/0211503 A1* | 9/2011 | Che | H04L 5/0005 370/280 |
| 2012/0230232 A1* | 9/2012 | Ji | H04B 7/2656 370/280 |
| 2012/0263057 A1 | 10/2012 | Choi et al. | |
| 2013/0188516 A1* | 7/2013 | He | H04W 28/16 370/254 |
| 2013/0194982 A1* | 8/2013 | Fwu | H04W 72/0493 370/280 |
| 2013/0272170 A1* | 10/2013 | Chatterjee | H04W 28/02 370/280 |
| 2014/0133366 A1* | 5/2014 | Ribeiro | H04W 52/146 370/278 |
| 2014/0286205 A1* | 9/2014 | Ghaboosi | H04L 5/001 370/280 |
| 2014/0307662 A1* | 10/2014 | Zheng | H04W 72/082 370/329 |
| 2015/0036519 A1* | 2/2015 | Kazmi | H04L 5/00 370/252 |
| 2015/0092757 A1* | 4/2015 | Tiirola | H04L 1/1861 370/336 |
| 2015/0188690 A1* | 7/2015 | Khoryaev | H04W 52/0251 370/280 |
| 2015/0256320 A1* | 9/2015 | Feng | H04W 52/146 370/280 |
| 2015/0312937 A1* | 10/2015 | Suzuki | H04W 72/0446 370/255 |
| 2015/0341927 A1* | 11/2015 | Wei | H04W 72/0446 370/280 |
| 2015/0381422 A1* | 12/2015 | Eriksson | H04B 7/2656 370/277 |
| 2016/0105248 A1* | 4/2016 | Lunttila | H04B 17/345 370/252 |
| 2016/0205690 A1* | 7/2016 | Berggren | H04L 5/001 370/280 |
| 2016/0360550 A1* | 12/2016 | Chen | H04L 5/0096 |
| 2017/0135073 A1* | 5/2017 | Tiirola | H04W 72/042 |

OTHER PUBLICATIONS

3GPP TS 36.211 V8.9.0 "3rd Generation Partnership Project; Technical Specification Group Radio Access Network; Evolved Universal Terrestrial Radio Access (E-UTRA); Physical Channels and Modulation (Release 8)," Dec. 2009, 83 pages.

3GPP TS 36.212 V8.8.0 "3rd Generation Partnership Project; Technical Specification Group Radio Access Network; Evolved Universal Terrestrial Radio Access (E-UTRA); Multiplexing and channel coding (Release 8)," Dec. 2009, 60 pages.

3GPP TS 36.213 V11.1.0, "3rd Generation Partnership Project; Technical Specification Group Radio Access Network; Evolved Universal Terrestrial Radio Access (E-UTRA); Physical layer procedures (Release 11)," Dec. 2012, 160 pages.

3GPP TS 36.213 V11.2.0, "3rd Generation Partnership Project; Technical Specification Group Radio Access Network; Evolved Universal Terrestrial Radio Access (E-UTRA); Physical layer procedures (Release 11)," Feb. 2013, 173 pages.

3GPP TS 36.214 V11.1.0, "3rd Generation Partnership Project; Technical Specification Group Radio Access Network; Evolved Universal Terrestrial Radio Access (E-UTRA); Physical layer; Measurement (Release 11)," Dec. 2012, 14 pages.

3GPP TS 36.321 V11.2.0, "3rd Generation Partnership Project; Technical Specification Group Radio Access Network; Evolved Universal Terrestrial Radio Access (E-UTRA); Medium Access Control (MAC) protocol specification (Release 11)," Mar. 2013 56 pages.

3GPP TR 36.828 V11.1.0, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)," Jun. 2012, 109 pages.

Extended European Search Report dated Oct. 9, 2013, for corresponding EP Application No. 13002457.3-1855, 9 pages.

International Search Report dated Aug. 4, 2015, for corresponding International Application No. PCT/EP2014/059325, 3 pages.

Samsung, "DL subframe set based mechanism to support TDD UL-DL reconfiguration," R1-131009, 3GPP TSG RAN WG1 #72bis, Agenda Item: 7.2.3.1, Chicago, USA, Apr. 15-19, 2013, 3 pages.

Sesia et al., "LTE The UMTS Long Term Evolution—From Theory to Practice," Wiley, 2009, 25 pages.

\* cited by examiner

| Uplink-Downlink configuration | Subframe Number | | | | | | | | | |
|---|---|---|---|---|---|---|---|---|---|---|
| | 20 | 21 | 22 | 23 | 24 | 25 | 26 | 27 | 28 | 29 |
| 0 | | | 16 | | 20 | | | 21 | | 25 |
| 1 | | | 15, 16 | 19 | | | | 20, 21 | 24 | |
| 2 | | | 14, 15, 18, 16 | | | | | 19, 20, 23, 21 | | |
| 3 | | | 15, 16, 11 | 17, 18 | 19, 20 | | | | | |
| 4 | | | 10, 14, 15, 11 | 17, 18, 19, 16 | | | | | | |
| 5 | | | 9, 10, 13, 14, 15, 17, 18, 11, 16 | | | | | | | |
| 6 | | | 15 | 16 | 19 | | | 20 | 21 | |

| 16 | subframe index of the ACK/NACK pending for that subframe |

Fig. 5

| Uplink-downlink configuration | Downlink-to-Uplink Switch-point periodicity | Subframe number | | | | | | | | | | Number of | | |
|---|---|---|---|---|---|---|---|---|---|---|---|---|---|---|
| | | 0 | 1 | 2 | 3 | 4 | 5 | 6 | 7 | 8 | 9 | D | U | S |
| 0 | 5 ms | D | S | U | U | U | D | S | U | U | U | 2 | 6 | 2 |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

D   Downlink subframe
U   Uplink subframe
S   Special subframe

Fig. 6

| Uplink-Downlink configuration Fm | Subframe Number | | | | | | | | | |
|---|---|---|---|---|---|---|---|---|---|---|
| | 0 | 1 | 2 | 3 | 4 | 5 | 6 | 7 | 8 | 9 |
| F0 | F | S | U | U | U | F | S | U | U | U |
| F1 | D | S | U | U | F | D | S | U | U | F |
| F2 | D | S | U | F | D | D | S | U | F | D |
| F3 | D | S | U | U | U | F | D | D | D | D |
| F4 | D | S | U | U | F | D | D | D | D | D |
| F5 | D | S | U | F | D | D | D | D | D | D |
| F6 | D | S | U | U | U | F | S | U | U | F |

D Downlink subframe
U Uplink subframe
S Special subframe
 Flexible subframe

Fig. 8

| Uplink-Downlink configuration Fm | Subframe Number | | | | | | | | | |
|---|---|---|---|---|---|---|---|---|---|---|
| | 0 | 1 | 2 | 3 | 4 | 5 | 6 | 7 | 8 | 9 |
| F0 | D | S | U | U | F | D | S | U | U | F |
| F1 | D | S | U | F | D | D | S | U | F | D |
| F2 | D | S | F | D | D | D | S | F | D | D |
| F3 | D | S | U | U | F | D | D | D | D | D |
| F4 | D | S | U | F | D | D | D | D | D | D |
| F5 | D | S | F | D | D | D | D | D | D | D |
| F6 | D | S | U | U | F | D | S | U | F | D |

D Downlink subframe
U Uplink subframe
S Special subframe
 Flexible subframe

Fig. 9

| Uplink-Downlink configuration Fm | Subframe Number | | | | | | | | | |
|---|---|---|---|---|---|---|---|---|---|---|
| | 0 | 1 | 2 | 3 | 4 | 5 | 6 | 7 | 8 | 9 |
| F0 | D | S | U | U | F | D | S | U | U | F |
| F1 | D | S | U | F | D | D | S | U | F | D |
| F2 | D | S | U | D | D | D | S | F | D | D |
| F3 | D | S | U | U | F | D | D | D | D | D |
| F4 | D | S | U | F | D | D | D | D | D | D |
| F5 | D | S | U | D | D | D | D | D | D | D |
| F6 | D | S | U | U | F | D | S | U | F | D |

D Downlink subframe
U Uplink subframe
S Special subframe
 Flexible subframe

Fig. 10

| Uplink-Downlink configuration | Subframe Number | | | | | | | | | |
|---|---|---|---|---|---|---|---|---|---|---|
| | 20 | 21 | 22 | 23 | 24 | 25 | 26 | 27 | 28 | 29 |
| 0 | | | 16 | | 20 | | | 21 | | 25 |
| 1 | | | 15, 16 | 19 | | | | 20, 21 | 24 | |
| 2 | | | 14, 15, 18, 16 | | | | | 19, 20, 23, 21 | | |
| 3 | | | 15, 16, 11 | 17, 18 | 19, 20 | | | | | |
| 4 | | | 10, 14, 15, 11 | 17, 18, 19, 16 | | | | | | |
| 5 | | | 9, 10, 13, 14, 15, 17, 18, 11, 16 | | | | | | | |
| 6 | | | 15 | 16 | 19 | | | 20 | 21 | | subframe index of the ACK/NACK pending for that subframe

▨ Flexible subframe

| Uplink-Downlink configuration | Subframe Number | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 4 | | | | ▨ | 9 | | | | ▨ | 14 | | | | ▨ | |
| 1 | | | | ▨ | 8 | | | | ▨ | 13 | | | | ▨ | | |
| 2 | | | | 7 | | | | ▨ | | | | | | | | |
| 3 | 4 | | | | ▨ | | | | | | 14 | | | | ▨ | |
| 4 | | | | ▨ | | | | | | 13 | | | | ▨ | | |
| 5 | | | | | | | | | | | | | | | | |
| 6 | | | 8 | | | ▨ | | | | ▨ | 14 | | | | ▨ | |

| 4 | subframe index of the subframe for which the uplink resource assignment is intended |
| ▨ | Flexible subframe |

Fig. 14

| Uplink-Downlink configuration Fm | Subframe Number | | | | | | | | | | Uplink-Downlink configuration |
|---|---|---|---|---|---|---|---|---|---|---|---|
| | 20 | 21 | 22 | 23 | 24 | 25 | 26 | 27 | 28 | 29 | |
| F0 | | | 15, 16 | 19 | ▨ | | | 20, 21 | 24 | ▨ | 1 |
| F1 | | | 14, 15, 18, 16 | ▨ | | | | 19, 20, 23, 21 | ▨ | | 2 |
| F2 | | | 9, 10, 13, 14, 15, 17, 18, 11, 16 | | | | | ▨ | | | 5 |
| F3 | | | 10, 14, 15, 11 | 17, 18, 19, 16 | ▨ | | | | | | 4 |
| F4 | | | 9, 10, 13, 14, 15, 17, 18, 11, 16 | ▨ | | | | | | | 5 |
| F5 | | | 9, 10, 13, 14, 15, 17, 18, 11, 16 | | | | | | | | 5 |
| F6 | | | 14, 15, 18, 16 | | | ▨ | | 19, 20, 23, 21 | ▨ | | 2 |

| 16 | subframe index of the ACK/NACK pending for that subframe |
| ▨ | Flexible subframe |

Fig. 15

| Uplink-Downlink configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 10 | 10=ACK | | | 11 | | 15=ACK |
| 1 | | | 6 | 9=ACK | | | | 11 | 14=ACK | |
| 2 | | | 8 | | | | | 13=ACK | | |
| 3 | | | 8 | 9 | 10=ACK | | | | | |
| 4 | | | 8 | 9=ACK | | | | | | |
| 5 | | | 8 | | | | | | | |
| 6 | | | 8 | 9 | 10=ACK | | | 11 | 15=ACK | |

[6] subframe index of the subframe in which a HARQ feedback is transmitted for this subframe Flexible subframe

Fig. 16

FLEXIBLE TDD UPLINK-DOWNLINK CONFIGURATION WITH FLEXIBLE SUBFRAMES

FIELD OF THE INVENTION

The invention relates to methods for communication between a mobile station and a base station based on a flexible TDD uplink downlink configuration. The invention is also providing the mobile station and the base station for participating in the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e. resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access.

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation.

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank.

Format 2B: Introduced in Release 9 and is used for the transmission of resource assignments for PDSCH for dual-layer beamforming.

Format 2C: Introduced in Release 10 and is used for the transmission of resource assignments for PDSCH for closed-loop single-user or multi-user MIMO operation with up to 8 layers.

Format 2D: introduced in Release 11 and is used for up to 8 layer transmissions; mainly used for COMP (Cooperative Multipoint)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB. The number of bits indicated in the right column include the bits for the CRC of the particular DCI.

TABLE

DCI Formats

| DCI format | Purpose | Number of bits including CRC |
|---|---|---|
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

In order that the UE can identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

TABLE

RNTIs

| Value (hexa-decimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Physical Downlink Control Channel (PDCCH) and Physical Downlink Shared Channel (PDSCH)

The physical downlink control channel (PDCCH) carries e.g. scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH}=2 \cdot N_{symb}^{DL}-N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant (i.e. resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH. Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference. In particular, Table 8-2 of TS 36.213 defines the parameter k for the TDD configurations 0-6, where k indicates the positive offset of the target of an uplink resource allocation received in a subframe; for TDD configuration 0 there is additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

Hybrid ARQ Schemes

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g. additional redundancy information).

Depending on the information (generally code-bits/symbols), of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. E.g. if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e. the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e. only a NACK is received) or whether eNode B requests a synchronous adaptive retransmission (i.e. PDCCH is signaled).

HARQ and Control Signaling for TDD Operation

As explained above, transmission of downlink or uplink data with HARQ requires that ACKnowledgement ACK or Negative ACK be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment. However, in the case of TDD operation, subframes are designated on a cell-specific basis as uplink or downlink or special (see next chapter), thereby constraining the times at which resource grants, data transmissions, acknowledgments and retransmissions can be sent in their respective directions. The LTE design for TDD therefore supports grouped ACK/NACK transmission to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 6) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 10.1.3, incorporated herein by reference explains the TDD HARQ-ACK feedback procedure. Table 10.1.3-1 of TS 36.213 gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9−4=5; subframe 5 of TDD configuration 0 being indeed a downlink subframe (see FIG. 6).

FIG. 5 is basically equivalent to Table 10.1.3-1 of TS 36.213, albeit transformed such that the numbers in the boxes do not indicate an offset, but directly the subframe number, which HARQ feedback is transported in said subframe. For illustration purposes, the subframes 20-29 are considered instead of subframe 0-9. As can be seen, for example subframe 23 of TDD configuration 6 carries the ACK/NACK/DTX of subframe 16, etc.

In HARQ operation, the eNB can transmit different coded version from the original TB in retransmissions so that the UE can employ incremental redundancy (IR) combining [8] to get additional coding gain over the combining gain. However in realistic systems, it is possible that the eNB transmits a TB to one specific UE on one resource segment, but the UE can not detect the data transmission due to DL control information lost. In this case, IR combining will lead to very poor performance for decoding the retransmissions because the systematic data has not been available at the UE. To mitigate this problem the UE should feed back a third state, namely discontinuous transmission (DTX) feedback, to indicate that no TB is detected on the associated resource segment (which is different from NACK indicating the decoding failure).

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e. uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance that the transmission and reception occur on the same carrier frequency, i.e. downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 6 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 7 shows the frame structure type 2, particularly for a 5 ms switch-point periodicity, i.e. for TDD configurations 0, 1, 2 and 6.

FIG. 7 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 6.

As can be appreciated from FIG. 6, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

TABLE special subframe configurations, Frame Structure Type 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UL/DL ACK/NACK feedback.

Shortcoming of Current Semi-Static TDD UL/DL Configuration Scheme

Currently, LTE TDD allows for asymmetric UL-DL allocations by providing seven different semi-statically configured uplink-downlink configurations, denoted static TDD configurations in the following (see FIG. 6). The current mechanism for adapting UL-DL allocation is based on the system information acquisition procedure or the system information change procedure, where the particular static UL-DL TDD configuration is indicated by a SIB, particularly by the TDD-config parameter in SIB1 (for details on the broadcast of system information, 3GPP TS 25.331, "Radio Resource Control (RRC)", version 6.7.0, section 8.1.1, incorporated herein by reference).

With the Release 8 system information change procedure, the supported time scale for a TDD UL/DL re-configuration is every 640 ms or larger. When re-using the ETWS (Earthquake and Tsunami Warning System), the supported time scale for UL-DL TDD re-configuration is every 320 ms or larger depending on the configured default paging cycle.

The semi-static allocation of the TDD UL/DL configuration may or may not match the instantaneous traffic situation. The time scale to change the static TDD configuration is rather large. It would be advantageous to adapt more quickly the TDD UL/DL configuration to the current traffic needs; for instance, in order to dynamically create more downlink subframes to increase downlink bandwidth or in order to dynamically create more blank uplink subframes to mitigate interference to the communication e.g. in uplink or downlink of a neighboring cell. Correspondingly, it is expected that Release 12 will adopt a more dynamic change of the TDD UL/DL configuration.

3GPP launched a study item TR 36.828 v11.0.0 to study the time scales of various types of TDD UL/DL re-configurations and their benefits and disadvantages. In general, the study item concluded that faster TDD UL/DL re-configuration time scales provide larger benefits than slower TDD UL/DL re-configuration time scales. Further, the amount of required specification changes varies depending on the supported re-configuration time scales.

SUMMARY OF THE INVENTION

One object of the invention is to provide a more flexible Time Division Duplex configuration operation, that solves the problems of the prior art as discussed above.

The object is solved by the subject matter of the independent claims. Advantageous embodiments are subject to the dependent claims.

The various embodiments of the invention are based on the concept that a new type of subframe, apart from the downlink, uplink and special subframe, is introduced into the TDD configurations. For simplicity, a configuration that is not containing flexible subframes is called a static TDD configuration, while a configuration that is containing at least one flexible subframe is called a flexible TDD configuration.

In particular, the TDD configuration used by the mobile station for communication in the uplink and downlink is made more flexible in that at least one subframe of a radio frame is defined as a flexible subframe. A flexible subframe can be used either for downlink or uplink communication (or may not be used for any downlink or uplink communication). In other words, a flexible subframe can be used in the same manner as either a downlink subframe or an uplink subframe. Of course, a flexible subframe could also be not used at all for any communication, to mitigate interference for this subframe at neighboring cells (similar to any uplink or downlink subframe). How to use the flexible subframe can change during communication from one flexible subframe to the next flexible subframe. For instance, a flexible subframe $n_{flex}$ in one radio frame may be for downlink, whereas the flexible subframe $n_{flex}$ in the next radio frame can be for uplink. The same applies to various flexible subframes in one radio frame.

A transition from a flexible subframe to an uplink subframe in such a flexible TDD configuration shall be avoided, as well as transitions between a downlink subframe and a flexible subframe.

According to a first aspect of the invention, the flexible TDD configuration, shall define for a radio frame the subframes to be uplink, downlink or special, with the difference that the flexible TDD configuration shall further define at least one subframe $n_{flex}$ of the radio frame as a flexible subframe such that generally, a flexible subframe always follows after a subframe that is defined for uplink transmission at its subframe end, and it always precedes a subframe that is defined for downlink transmission at its subframe beginning.

More specifically for 3GPP subframe types, a flexible TDD configuration defines a subframe to be a flexible subframe such that
   subframe $n_{flex}-1$ is a special subframe or an uplink subframe, and
   subframe $n_{flex}+1$ is a downlink subframe or a special subframe.

Consequently, a flexible subframe always follows either a special or uplink subframe, and precedes always a downlink or special subframe. And thus, transitions from a downlink subframe to a subsequent flexible subframe are avoided, as well as transitions from a flexible subframe to a subsequent uplink subframe. Furthermore, the selective use of the flexible subframe as either a downlink or uplink subframe allows a better adaptation to the current traffic.

As explained for this aspect, a flexible TDD configuration is thus defined, according to which the mobile station may perform the communication with e.g. the base station. Of course, there may be more than one flexible TDD configurations, each with a different number of downlink, uplink, special and flexible subframes, so as to be even more flexible and to allow a better adaptation to the traffic by selecting one of the various flexible TDD configurations.

According to a first variant of the first aspect, it is assumed that the at least one flexible TDD configuration is predefined and thus already known in the mobile station and the base station. In other words, the mobile station and the base station hold information for the at least one flexible TDD configuration (as for the seven static TDD configurations) defining the TDD type of subframes for a radio frame. Correspondingly, the base station may provide an instruction to the mobile station to change to a particular flexible TDD configuration by merely identifying the flexible TDD configuration. This is similar to the currently employed use of the TDD-config parameter in SIB1 for identifying the static TDD configuration (see Background Section).

In theory, the flexible TDD configurations could be defined completely independent from the currently-standardized static TDD configurations (as long as the above-noted requirements for a flexible subframe are fulfilled). In other words, disregarding the flexible subframes that are not used in any static TDD configuration anyway, also the remaining non-flexible subframes (i.e. uplink, downlink and special) can be defined differently than in any of the static TDD configurations.

On the other hand, it may be advantageous for a flexible TDD configuration to match as much as possible one of the static TDD configurations, apart from the flexible subframe(s) of course. Since the base station of a mobile communication system generally needs to be able to communicate efficiently with different UEs, out of which some will presumably support flexible subframes while others will not, it is advantageous if a plurality of subframes (ideally as many subframes as possible) have the same meaning for those different types of UEs. Consequently a UE that does not support flexible subframes operates according to a static TDD configuration, and a UE that does support flexible subframes can be operated according to a static or a flexible TDD configuration. In said case, a flexible TDD configuration defines the subframes of a radio frame to be uplink, downlink and special the same as done by one of the static TDD configurations with the exception that at least one of the subframes is defined differently as a flexible subframe. As explained above the requirements to be fulfilled by a flexible subframe are that subframe $n_{flex}-1$ of the static/flexible TDD configuration is a special subframe or an uplink subframe, and subframe $n_{flex}+1$ of the static/flexible TDD configuration is a downlink subframe or a special subframe.

Assuming that the flexible TDD configuration defines the non-flexible subframes in the same manner as one of the static TDD configuration, it may be further beneficial if the subframe $n=n_{flex}$ of the static TDD configuration is an uplink subframe; in other words, if the flexible TDD configuration redefines only uplink subframe(s) (not downlink subframes) into flexible subframe(s). Legacy UEs, or more generally UEs that cannot communicate according to a flexible TDD configuration, may still use downlink and special subframes for downlink signal measurements.

According to a second variant of the first aspect, a flexible TDD configuration is not predefined as explained above, but derived from one of the static TDD configuration, directly in the mobile station and base station. In said particular case, there is no separate flexible TDD configuration predefined in the mobile station and base station, but instead the mobile station and the base station determine the flexible TDD configuration to be used for communication from one of the static TDD configurations. For instance, upon indication by the base station, the mobile station (and also base station) may change the static TDD configuration currently used for communication into a corresponding flexible TDD configuration by redefining for at least one subframe $n_{flex}$ the type of subframe into flexible such that the following requirements are fulfilled:

subframe $n_{flex}-1$ of the static TDD configuration is a special subframe or an uplink subframe, and
subframe $n_{flex}+1$ of the static TDD configuration is a downlink subframe or a special subframe.

Optionally, the redefining of a subframe type of one of the static TDD configurations to arrive at a flexible TDD configuration can be done further such that only uplink subframes can be changed to a flexible subframe, i.e. subframe n of the corresponding static TDD configuration is an uplink subframe, where $n=n_{flex}$.

In this second variant, instead of directly indicating the particular flexible TDD configuration (among the various predefined flexible TDD configurations) to be used, an indication to change to a flexible TDD configuration may suffice. This may be done by a single bit activating and deactivating flexibility of a TDD configuration. In response to receiving a trigger to change the static TDD configuration to flexible (independent from which particular static TDD configuration is currently used), the mobile station (and also the base station after sending the trigger) derive/determine the flexible TDD configuration to be used for communication from the static TDD configuration by applying the above-explained algorithm/requirements.

A further important second aspect of the invention refers to the issue of how to determine whether a flexible subframe should be used as a downlink or uplink subframe. It is assumed that the mobile station and the base station are communicating with each other based on a flexible TDD configuration, i.e. including at least one flexible subframe in each radio frame; according to any of the variants of the first aspect explained above. Actually, the second aspect of the invention is independent from the first aspect, and should thus be treated somewhat separately. In particular, how to determine whether a flexible subframe is used as a downlink or an uplink subframe is independent from how a complete flexible TDD configuration is defined and indicated; the second aspect refers to each flexible subframe and is independent from which subframe type follows or precedes the flexible subframe or from how many flexible subframes are defined for each radio frame.

It is important that both the mobile station and the base station have the same understanding of how the flexible subframe is to be used, so as to avoid waste of resources. For instance, when the base station uses the flexible subframe for a downlink transmission while the mobile station uses the same flexible subframe for an uplink transmission, the flexible subframe resources are wasted. The use of the flexible subframe may be either controlled implicitly or by explicit signaling as will be explained in the following.

According to one variant of the second aspect, the use of the flexible subframe as downlink or uplink depends on whether any uplink transmissions are pending for said flexible subframe. More specifically, in case the mobile station has at least one uplink transmission that is supposed to be transmitted in the flexible subframe, then the flexible subframe is to be used as an uplink, i.e. subframe for the pending uplink communications and possibly further uplink transmissions. Conversely, if there is no uplink transmission pending for the flexible subframe, then the flexible subframe can be used as a downlink subframe for potential downlink communications.

Uplink transmissions can be pending due to many reasons. For example, the base station may have dynamically scheduled an uplink transmission for the flexible subframe, in which case the base station knows when an uplink transmission is pending for the flexible subframe.

Or, an uplink data transmission may be scheduled for the flexible subframe due to a semi-persistent resource allocation. The base station knows the semi-persistent allocation configuration used by the mobile station and thus may also foresee that a flexible subframe will fall on a semi-persistently-scheduled uplink transmission, and then determines the flexible subframe to be used as an uplink subframe.

Or a retransmission protocol uplink feedback (such as HARQ ACK/NACK/DTX) for a previous downlink transmission may be due for the flexible subframe; retransmission protocol uplink feedback is performed according to a predefined timing which is also known to the base station, for which reason the base station also knows when an uplink transmission for a retransmission protocol uplink feedback is pending for a flexible subframe.

Or channel state information reports may be pending for a flexible subframe. CSI reports can be transmitted periodically according to a predefined configuration known to both the mobile station and the base station; a CSI report may also be dynamically triggered by the base station. In both cases, the base station knows when a CSI report is pending for a flexible subframe.

In case the mobile station needs to transmit user data, it will send a scheduling request to the base station, requesting uplink resources for the uplink transmission; although the base station does not know exactly when a mobile station will actually transmit a scheduling request, the base station knows which subframes can be used for transmitting scheduling requests, since there are configurable restricted opportunities for the mobile station to transmit a scheduling request. The base station knows about the configuration. In said case, any flexible subframe that gives the mobile station an opportunity to transmit a scheduling request shall thus be considered as an uplink subframe.

Similarly, a random access message is transmitted by the mobile station to e.g. achieve uplink time synchronization when the UE has lost its uplink synchronization, or to connect to a base station, or to request transmission resources. The UE can only be scheduled for uplink transmissions if its uplink transmission timing is synchronized. Again, there are configurable restricted opportunities for the mobile station for transmission of a random access message; the base station knows abut the configuration. In said case, any flexible subframe that gives the mobile station an opportunity to transmit a random access message shall thus be considered as an uplink subframe.

In the above cases, the presence or absence of an uplink transmission in the flexible subframe is taken as the criterion for determining the flexible subframe to be usable as an uplink subframe or downlink subframe. This implicit "indication" however can lead to difficulties in that the base station and mobile station may easily have a different understanding of whether an uplink transmission is pending or not for the flexible subframe, for example in case of undetected errors in configuration messages, or due to an unknown latency in the UE between the reception of a configuration message and the application of same. Also, for some of the above transmissions, the base station can not know in advance whether an uplink transmission is indeed pending, or whether the uplink transmission opportunity is not used by the UE. This reduces the number of times that the flexible subframe may be used for downlink and thus reduces the downlink capacity.

Therefore, to avoid the above disadvantages of the implicit signaling, although at the cost of additional signaling, it may be advantageous to explicitly define whether a flexible subframe is to be used as a downlink or uplink subframe. The base station may take the corresponding decision on the flexible subframe usage and transmit an instruction to the mobile station that informs the mobile station how a particular flexible subframe is to be used.

According to a particular example for the explicit signaling, the base station may transmit control information for an uplink resource assignment to the mobile station, where the CRC of the control information is scrambled with a non-usual identifier such as one of:

a Paging-RNTI, a System Information-RNTI, a Random Access-RNTI, a Multimedia Broadcast Multicast Service-RNTI, a predefined flexible-TDD-RNTI.

The predefined flexible-TDD-RNTI, may be a newly introduced RNTI, specific for the purpose of controlling whether a flexible subframe is to be used as uplink or downlink subframe.

In an LTE system, this control information for an uplink resource assignment is a DCI of Format 0, or for those UEs supporting it, DCI format 4 can alternatively be used for an uplink resource assignment. A DCI Format 0 or 4 is usually scrambled with a particular identifier of the mobile station, such as the C-RNTI or (SPS-C-RNTI for SPS), but not with one of the above identifiers that are common to several UEs.

The specific DCI Format 0/4 is transmitted from the base station at the appropriate timing of a DCI Format 0/4 that actually assigns uplink resources in the flexible subframe. Furthermore, the DCI Format 0/4 may preferably be transmitted in the common search space, such that it may actually be received by all the UEs in the cell.

Correspondingly, the mobile station when detecting a control information for the uplink resource assignment (DCI Format 0/4) with the corresponding CRC being scrambled by one of said identifiers, it determines that the corresponding flexible subframe according to the reception timing of the uplink resource assignment may be used as an uplink subframe. In the other case, i.e. when no such uplink resource assignment is received, the mobile station determines that the flexible subframe may be used as a downlink subframe.

The just-mentioned DCI Format 0/4 may or may not assign actual resources for an uplink transmission in the flexible subframe. In particular, the DCI Format 0/4 is not encoded with the UE-specific C-RNTI, but with another RNTI, and would thus usually not be regarded by the mobile station as a "normal" uplink resource assignment. Nevertheless, the UE(s) receiving this DCI Format 0/4 may still use it as a normal uplink resource assignment. Alternatively, the UE(s) receiving this specially-scrambled DCI Format 0/4 may ignore it as a normal uplink resource assignment, and may only derive therefrom that the corresponding flexible subframe is to be used as an uplink subframe; a separate uplink resource assignment, scrambled with the C-RNTI or SPS-C-RNTI, may be received in addition.

It may be further advantageous that the special DCI Format 0/4 indicates an invalid value (or predefined value) of uplink resources, so as to enhance error resilience. Consequently, not only shall the CRC of the uplink resource assignment be scrambled with a particular RNTI (see above), but the uplink resource assignment shall indicate an invalid (or predefined) resource assignment, in order to indicate a particular flexible subframe as an uplink subframe.

Alternatively or additionally, the use of the flexible subframe as a downlink subframe is indicated by the use of control information for a downlink resource assignment scrambled with one of:

a Paging-RNTI, a System Information-RNTI, a Random Access-RNTI, a Multimedia Broadcast Multicast Service-RNTI, a predefined flexible-TDD-RNTI.

In an LTE system, this control information for a downlink resource assignment is a DCI of Format 1A, for example. A DCI Format 1A assigns resources for the same subframe at which the DCI Format 1A is received. For the purpose of indicating the usage of a flexible subframe, this timing would be however too late, for which reason the specially-scrambled DCI Format 1A is transmitted at the timing of an uplink resource assignment assigning uplink resources in the flexible subframe, i.e. a DCI Format 0.

Additionally, the DCI Format 1A shall indicate an invalid value of downlink resources to enhance error resilience. Furthermore, the DCI Format 1A may be transmitted in the common search space, such that it may actually be received by all the UEs in the cell.

In any case, it is possible according to any of the variants of the second aspect to selectively use a flexible subframe as a downlink or uplink subframe, and this may be controlled explicitly by the base station with corresponding indications (DCI Format 0, 1A), or may be implicitly controlled depending on the presence or absence of pending uplink transmissions in the mobile station for the flexible subframe.

A third aspect of the invention aims at reducing the number of uplink transmissions that are pending for a flexible subframe. Reducing the number of uplink transmission that are to be performed in a flexible subframe is advantageous for instance in that the flexible subframe may be used more often as a downlink subframe and thus can increase the downlink capacity of the flexible TDD configuration.

The third aspect of the invention, as explained in the following, shall be regarded as being somewhat separate from the above-noted first and second aspects. In particular, although it may be a prerequisite for the third aspect that a flexible TDD configuration is used, it is not necessarily important for most of the variants of the third aspect how the TDD configuration is defined in detail, or how same is indicated to the mobile station, or how the flexible subframe is determined to be either for uplink or downlink.

In one variant, the timings for transmitting the retransmission protocol uplink feedback, i.e. in LTE the HARQ uplink ACK/NACK/DTX feedback, to the base station are changed such that same is never transmitted in a flexible subframe, but instead in another of the uplink subframes in the radio frame. This may be achieved e.g. by reusing the particular HARQ feedback timings already predefined for the static TDD configurations. In particular, a specific flexible TDD configuration is associated with a HARQ feedback timing of one of the several static TDD configurations, such that the HARQ feedback timing does not fall on one of the flexible subframes.

In a further variant, which may or may not be combined with the previous one, non-adaptive uplink retransmissions of previously-transmitted data shall not be transmitted in a flexible subframe. This may be done e.g. by either ignoring the corresponding NACK feedback of the base station for the previous transmission, or by automatically determining that a HARQ feedback for a previous transmission, which non-adaptive re-transmission would fall on a flexible subframe, is an ACK (independent from what the actual HARQ feedback is).

In still another variant, which may or may not be combined with the previous ones, other pending uplink transmission that can be due for a flexible subframe are not allowed in the mobile station. This includes: a data uplink transmission scheduled semi-persistently for the flexible subframe, a scheduling request to request resources for an uplink transmission, a channel state information report, an uplink sounding signal, a random access transmission.

BRIEF DESCRIPTION OF THE FIGURES

In the following the invention is described in more detail with reference to the attached figures and drawings.

FIG. 5 illustrates the HARQ ACK/NACK/DTX feedback timing for the static TDD configurations 0-6 as defined by 3GPP LTE, FIG. 6 shows the seven currently-standardized (static) TDD UL/DL configurations 0-6, the respective definitions of the 10 subframes and their switch-point periodicity, FIG. 8-10 illustrate three different example of a set of flexible TDD configurations F0-F6 according to variants of the first embodiment, FIG. 14 illustrates a timing relation between the reception of uplink resource assignments and the corresponding subframes for which the received uplink resource assignments are intended, especially in relation to the flexible subframes according to FIG. 10, FIG. 15 illustrates the HARQ ACK/NACK/DTX feedback timing in the uplink for the flexible TDD configurations F0-F6 as assumed in FIG. 10 according to one embodiment of the invention, and FIG. 16 illustrates the HARQ ACK/NACK/DTX feedback timing in the downlink for the flexible TDD configurations of FIG. 10, according to another embodiment of the invention.

DETAILED DESCRIPTION OF THE INVENTION

Figure 1:
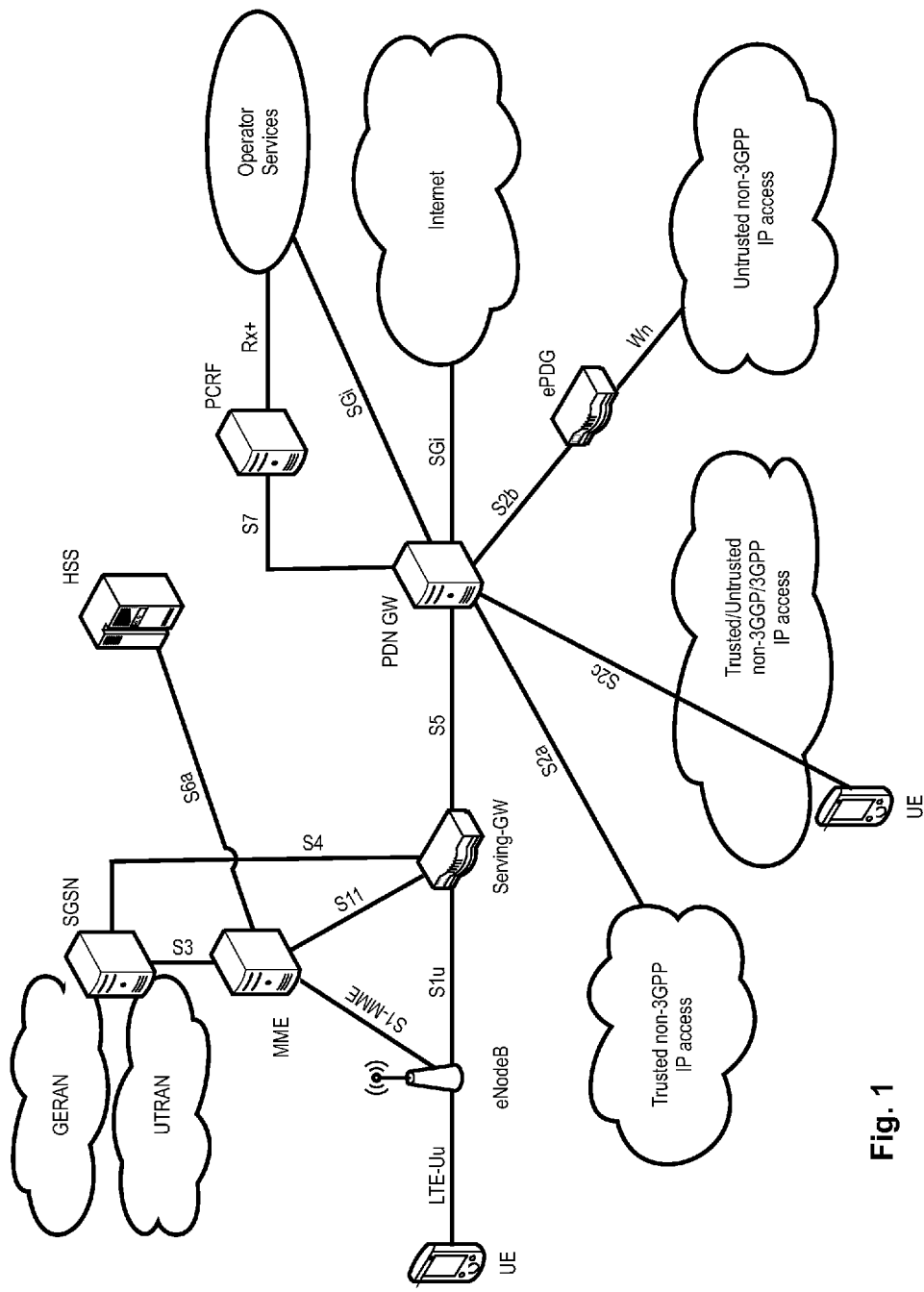
FIG. 1 shows an exemplary architecture of a 3GPP LTE system.
Figure 2:
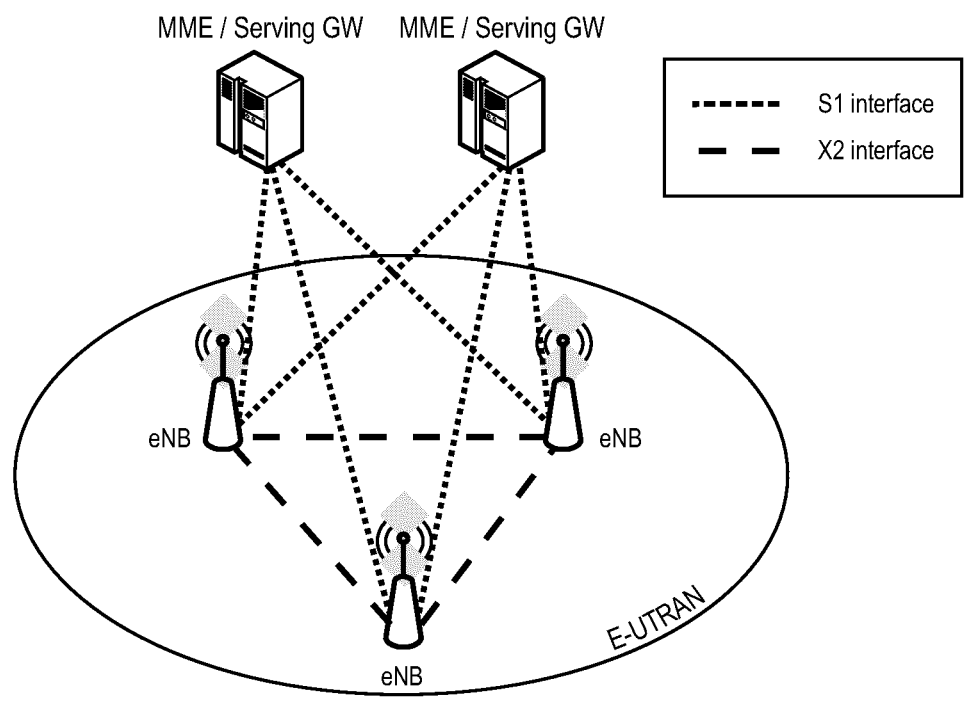
FIG. 2 shows an exemplary overview of the overall E-UTRAN architecture of 3GPP LTE.
Figure 3:
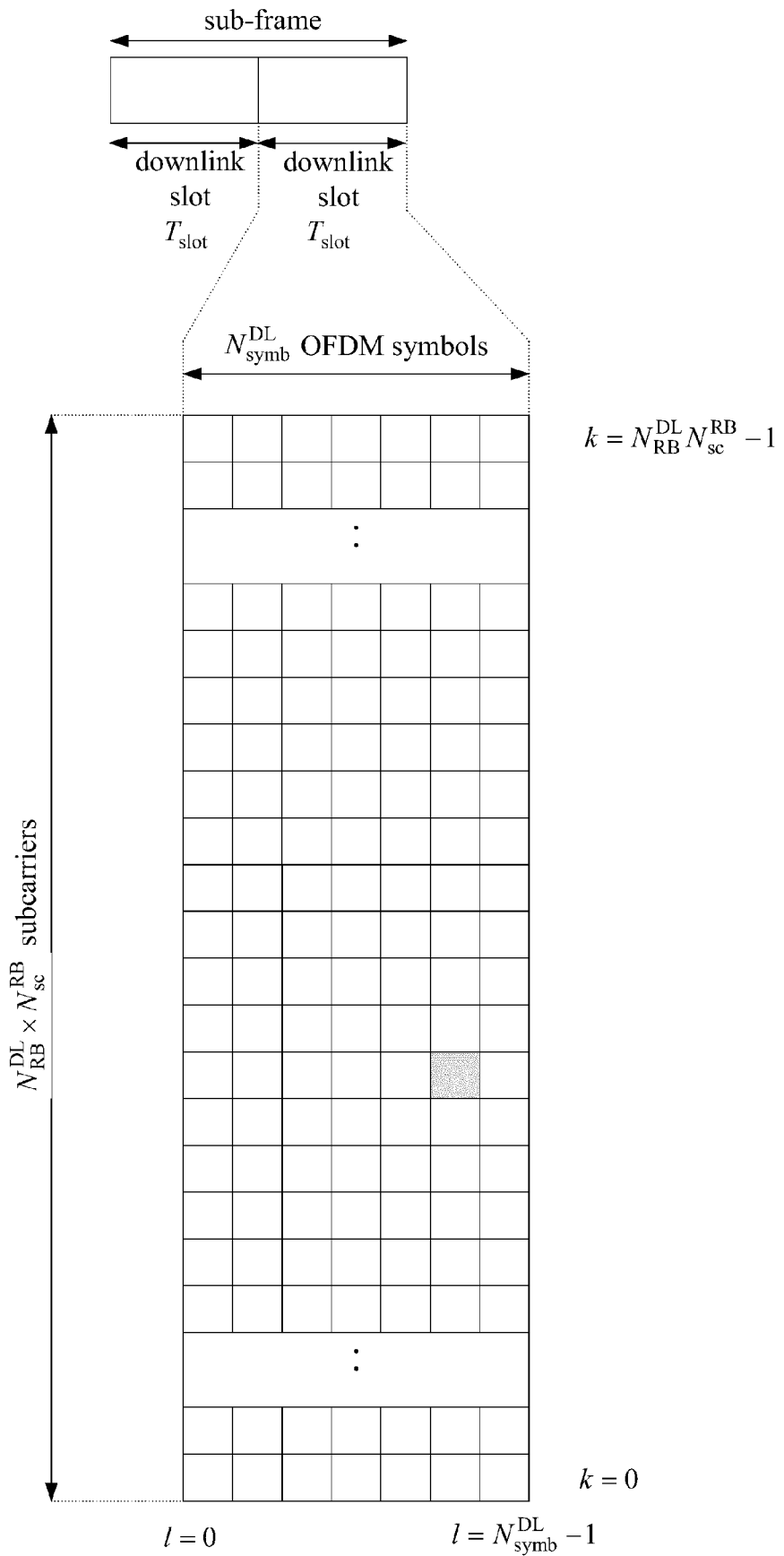
FIG. 3 shows exemplary subframe boundaries on a downlink component carrier as defined for 3GPP LTE (as of Release 8/9)
Figure 4:
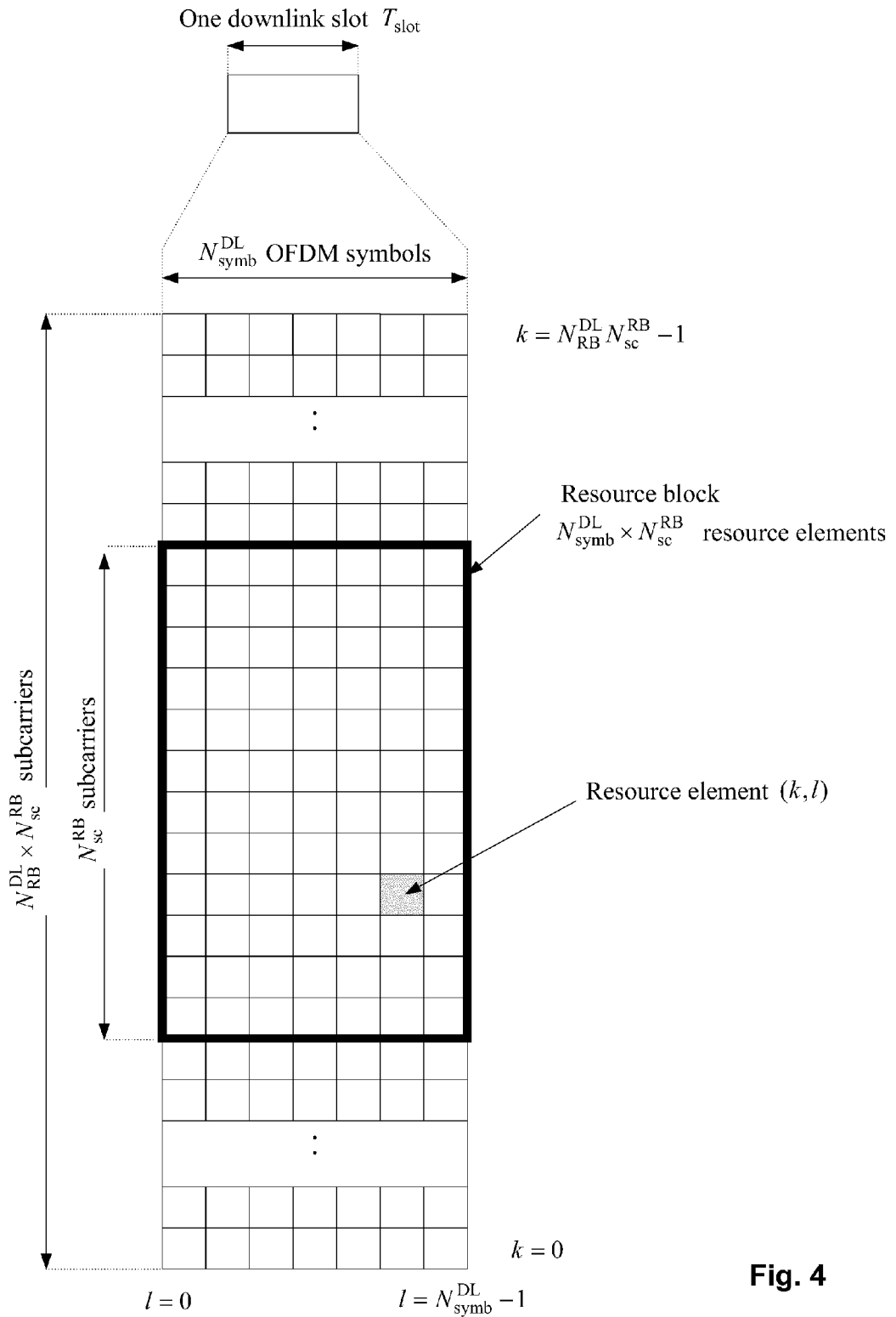
FIG. 4 shows an exemplary downlink resource grid of a downlink slot as defined for 3GPP LTE (as of Release 8/9)
Figure 7:
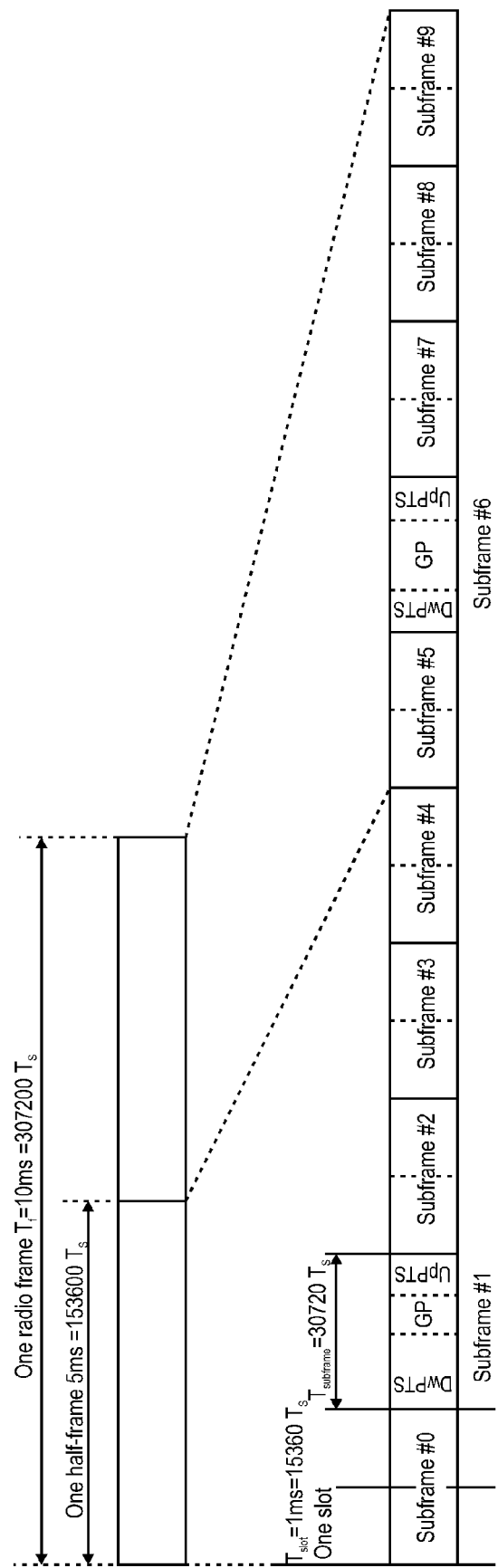
FIG. 7 illustrates the structure of a radio frame, being composed of two half-frames and 10 subframes, for a 5 ms switch-point periodicity.

The following paragraphs will describe various embodiments of the invention. For exemplary purposes only, most of the embodiments are outlined in relation to a radio access scheme according to 3GPP LTE (Release 8/9) and LTE-A (Release 10/11/12) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

The term "static TDD configuration" refers to the TDD uplink/downlink configuration as defined in the current standard, where the TDD configuration defines for each subframe of a radio frame whether same is a downlink, uplink or special subframe. The term "TDD configuration index" is a number (currently 0-6) respectively associated with one out of the seven possible TDD UL/DL configurations, and is defined in the technical standards of 3GPP (see FIG. 6). The invention differs between a "static TDD configuration" and a "flexible TDD configuration", wherein the flexible TDD configuration, further to the uplink, downlink and special subframes, defines flexible subframes.

The term "flexible subframe" used in the claims and the description shall be understood as a subframe that can be flexibly used as an uplink or downlink subframe; this may be decided separately for each flexible subframe. The term "dynamic downlink subframe" or "flexible downlink subframe" used in the claims and the description shall be understood as a flexible subframe that is used as a downlink subframe. The term "dynamic uplink subframe" or "flexible uplink subframe" used in the claims and the description shall be understood as a flexible subframe that is used as an uplink subframe.

The term "subframe n" refers to any subframe in a radio frame, whereas the term "subframe $n_{flex}$" shall refer to a flexible subframe.

The term "scrambling" used in the claims in connection with the error detection code and used in the detailed description mainly in connection with a CRC (as an example of the error detection code) refers to the process of implicitly encoding e.g. an identifier into the error detection code (CRC). The term "masking" and also the term "configured by" is used equivalently to "scrambling" in the technical field to mean that an identifier is encoded into a CRC, or more general, into an information element (e.g. a DCI).

The term "invalid parameter" used in the claims and the description shall be broadly understood as a parameter having an invalid value, thus constituting an invalid parameter.

In the following, several embodiments of the invention will be explained in detail. The explanations should not be understood as limiting the invention, but as mere examples of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The various embodiments explained for the invention in general refer to TDD configurations and in particular shall provide an improved and more flexible TDD configuration and related mechanisms/processes.

First Embodiment

A first set of embodiments of the invention mainly relates to the definition of the flexible TDD configuration, and in particular to how a flexible subframe can be introduced into the TDD configuration(s). Until now a static TDD configuration defines uplink, downlink and special subframe on a radio frame basis, and with a periodic pattern of 5 ms or 10 ms. The uplink subframes can only be used for uplink communications, and conversely the downlink subframes only for downlink communications. Therefore, the TDD configurations are rather fix and static. The change between the seven available TDD configurations is slow, and not practicable for adapting the TDD operation to fast changing traffic conditions.

By introducing at least one flexible subframe in each radio frame, i.e. by defining at least one flexible subframe in a flexible TDD configuration, it is possible to make the TDD operation more flexible; the flexible subframe may be used as a downlink or uplink subframe.

In general, a transition from a downlink subframe n to an uplink subframe n+1 shall be avoided, since then the UE would need to switch its circuitry from reception to transmission and apply timing advance adjustments, as explained in the Background section in connection with the special subframes and the guard period.

Although in the following it is assumed for simplicity that two (or more) subsequent subframes are not defined as flexible, according to one variant of the first embodiment it is indeed possible, as long as a transition of a flexible downlink subframe to a flexible uplink is avoided. Subsequent flexible subframes can be defined as flexible, in which case however the particular use of the first subframe may already fix the use of the next (and possibly further) flexible subframe(s). In one extreme case, for example, a flexible TDD configuration F0 can be defined with the sequence of D, S, F, F, F, D, S, F, F, F for subframes 0-9 of a radio frame. When the flexible subframe of index 2 is determined to be an uplink subframe, then the subsequent flexible subframe of index 3 can be freely selected to be either uplink or downlink. However, in case the flexible subframe of index 2 is determined to be a downlink subframe, then the subsequent flexible subframe of index 3 (and also the one of index 4) must be used as downlink subframe too, so as to avoid the transition from downlink to uplink between two subsequent subframes. The same applies to the remaining flexible subframes of the above-indicated TDD configuration sequence. This concept can also be applied to other flexible TDD configurations.

According to another variant of the embodiment, in order to avoid the need for a guard period of a special subframe, a flexible subframe in a flexible TDD configuration shall always follow after a subframe, the end of which is defined for uplink transmissions, and shall always be ahead of (precede) a subframe, the beginning of which is defined for downlink transmissions. More specifically for 3GPP LTE a subframe n can only be a flexible subframe $n_{flex}$ if:
 subframe $n_{flex}-1$ is a special or uplink subframe, or
  subframe $n_{flex}-1$ is a downlink subframe where no downlink transmission actually takes place;
 subframe n+1 is a downlink or a special subframe.

Alternatively, a subframe n can only be a flexible subframe $n_{flex}$ if:
 subframe $n_{flex}-1$ is a special or uplink subframe, or
  subframe $n_{flex}-1$ is a downlink subframe where no downlink transmission actually takes place,
 subframe $n_{flex}+1$ is a downlink or special subframe, or
  subframe $n_{flex}+1$ is an uplink subframe where no uplink transmission actually takes place.

However, the above requirement of whether an uplink/downlink transmission actually takes place in subframes $n_{flex}+1$ or $n_{flex}-1$ complicates the resource management and also introduces potential error cases if transmissions are missed or occur erroneously. Consequently, the above requirements may be further improved as follows:
 A subframe n can only be a flexible subframe $n_{flex}$ if
 subframe $n_{flex}-1$ is a special or uplink subframe,
 subframe $n_{flex}+1$ is a downlink or special subframe.

Any flexible TDD configuration that fulfills the above requirements for its flexible subframes may be used by the mobile station and the base station according to the invention. Consequently, a flexible subframe always follows after either a special or uplink subframe, and always precedes a downlink or special subframe, such that transitions from a flexible subframe to an uplink subframe, and transitions from a downlink subframe to a flexible subframe are avoided.

Although only one flexible TDD configuration is mentioned so far, there may be several flexible TDD configurations (e.g. F0-F6), similar to the static TDD configurations 0-6 already predefined according to 3GPP LTE (see FIG. 6); the various flexible TDD configurations provide a different definition of the subframe types for a radio frame, however they all shall fulfill the above requirements. In the following, it is assumed for explanatory purposes that there are several flexible TDD configurations.

The above-described flexible TDD configuration may define the uplink, downlink, special and flexible subframes, in any way suitable, as long as the requirements for the flexible subframes are fulfilled. However, according to a more preferable variant of the first embodiment, the flexible TDD configurations shall match the corresponding static TDD configurations, except for the flexible subframes. This allows an efficient communication between the eNodeB and the various UEs. More specifically, some UEs will support the use of the flexible TDD configurations (in addition to the use of the static TDD configurations), however other UEs might not. Therefore, it is advantageous if all UEs have the same meaning on the subframe type of as many subframes in a radio frame as possible. Another advantage is that due to the correspondence between a static TDD configuration m and the flexible TDD configuration Fm, the indication to the UE instructing it to use a flexible TDD configuration can be simply an indication to use a flexible instead of static TDD configuration. Hence, the control signaling overhead can be reduced compared to a solution that require the explicit signaling of a flexible TDD configuration on top of the signaling of a static TDD configuration. More details will be explained later.

According to this variant, the flexible TDD configurations are defined to be the same as the corresponding static TDD configurations, with the exception of the at least one flexible subframe in the radio frame; in other words, a flexible TDD configuration defines the uplink, downlink and special subframes in the same manner as the corresponding static TDD configuration, albeit that the flexible TDD configuration defines at least one subframe as a flexible subframe. Although not directly important to the invention, it should be noted that also other parameters defined for a static TDD configuration are likewise re-used for the flexible TDD configuration, such as the definition of a special subframe and its downlink pilot time slot, guard period and uplink pilot time slot.

This will be exemplified in the following with use of FIG. 8-10.

FIG. 8-10 illustrate different flexible TDD configurations according to different variants of the first embodiment, and shall exemplify how to apply the above-discussed requirements for a potential flexible subframe in combination to the static TDD configurations.

The basis of FIG. 8-10 is the static TDD configurations as defined by 3GPP LTE and illustrated in FIG. 6. Based thereon, when applying the above-noted requirements for a flexible subframe, FIGS. 8 and 9 illustrate two different results; FIG. 8 assuming that downlink subframes of the static TDD configuration are "changed" into flexible subframes, whereas FIG. 9 assumes that uplink subframes of the static TDD configurations are defined as flexible subframes. Although not illustrated in a separate figure, also a mixture of these two is possible.

The flexible TDD configuration of FIG. 9, where flexible subframes are only defined where the corresponding static TDD configuration defines an uplink subframe, is beneficial over the variant of FIG. 8 where flexible subframes are only defined where the corresponding static TDD configuration defines a downlink subframe. Since not all UEs, especially legacy UEs, will be able to treat flexible subframes correctly, they would operate and communicate according to the static TDD configuration, where every downlink and special subframe can be used for downlink signal measurements. Correspondingly, the downlink subframes may still be used for downlink measurements. Furthermore, when assuming a flexible TDD configuration of FIG. 8, a downlink subframe for a UE that does not support the flexible TDD configuration, is assumed to be a flexible subframe for a UE that does support the flexible TDD configuration such that said flexible/downlink subframe might erroneously be used by the legacy UE for downlink measurements although the flexible subframe is used for uplink by another UE, thus potentially corrupting the measurements of the legacy UE(s). This effect is also possible for non-legacy UEs in case that there is an erroneous understanding at the UE whether a flexible subframe is used for uplink or downlink. Typical measurements include short-term channel state measurements usable for determining a suggested modulation and coding scheme for downlink transmissions, or radio link measurements as defined in 3GPP TS 36.214 v11.1.0. Among those the RSSI, RSRP or RSRQ measurements are particularly relevant, as they can be used to determine the long-term link quality to one or more base stations, which may be further used to establish a link to the base station with the strongest received signal or signal quality.

In order to avoid measurement corruption caused by measurements in flexible subframes, in a preferred variant of the first embodiment, a UE will not use flexible subframes to perform these measurements, not even, if a flexible subframe is determined to be used as downlink subframe; instead, the UE will base its measurements exclusively on non-flexible (or static) downlink or special subframes of the flexible TDD configurations (or static TDD configuration).

Correspondingly, the more beneficial variant of FIG. 9 allows a further requirement to be formulated for the flexible subframes, namely that a flexible subframe $n_{flex}$ shall be defined such that subframe n of the corresponding static TDD configuration is an uplink subframe, where $n=n_{flex}$. In other words, a subframe n shall only be defined as a flexible subframe if the corresponding subframe of the static TDD configuration is an uplink subframe.

Another more beneficial variant of the flexible TDD configuration definition is illustrated in FIG. 10. It is advantageous to have at least one non-dynamic uplink subframe per radio frame available. As can be seen from flexible TDD configuration F5 according to FIG. 9, there is no uplink subframe but only 8 downlink subframes, and one special and one flexible subframe. For instance, the flexible TDD configuration shall define at least one flexible subframe per radio frame, but only as long as at least one uplink subframe remains defined. In case of flexible TDD configuration F5, this actually means that no flexible subframe may be defined since the subframe n=2 fulfilling the previous requirements, cannot be used since the corresponding flexible TDD configuration would not fulfill the requirement of defining at least one uplink subframe. For the flexible TDD configuration F2, as illustrated in FIG. 9, only one of the two potential flexible subframes $n_{flex}=2$ and 7 may be defined as flexible subframe. The remaining flexible TDD configurations of FIG. 9 already fulfill this additional requirement of having at least one uplink subframe.

Alternatively to the above requirement of always defining at least one uplink subframe for a flexible TDD configuration, the following requirement shall be fulfilled by a flexible TDD configuration: the flexible TDD configuration shall define the subframe of TDD configuration subframe index=2 always as an uplink subframe, as illustrated by FIG. 10. In other words, the subframe of TDD configuration subframe index 2 cannot be a flexible subframe. A benefit is the harmonization among the different TDD configurations, which allows for example having knowledge about the position of at least one uplink subframe without the need for knowing whether a static or a flexible configuration is used, or without the need for knowing which static or flexible TDD configuration is used.

The following explanation of further variants and further embodiments will mainly focus on the flexible TDD configuration of FIG. 10. However, as apparent to a skilled person, the following explanation shall not be limited thereto, but is likewise applicable to the other flexible TDD configurations explained above, such as those of FIGS. 8 and 9.

By introducing a flexible subframe according to a flexible TDD configuration, it is not only possible to flexibly adapt one flexible TDD configuration to the uplink/downlink needs, but overall the downlink capacity of the flexible TDD configuration increases compared to that of the corresponding static TDD configuration. Therefore, when assuming the flexible TDD configurations of FIG. 10 vis-à-vis the static TDD configuration currently defined in 3GPP LTE (see FIG. 6), the downlink capacity of a radio frame can be increased as indicated by the following Table. A special subframe S has different downlink capacities depending on the particular special subframe configuration used; for instance, according to the Table for special subframe configuration in the Background Section, and assuming a normal cyclic prefix in the downlink, 19760*TS out of 307200*TS are defined for the downlink in TDD configuration 1, which amounts to about 64% downlink of the total special subframe. As can be seen from said table the particular amount of downlink in a special subframe varies from one TDD configuration to the next. Contrary to this explanation but to simplify the comparison of the maximum downlink capacity of a radio frame, a downlink ratio of 64% is assumed for all special subframes in the static and flexible TDD configurations, which are therefore counted as 0,64 of a DL subframe for the purpose of this assessment. Furthermore of course, the flexible subframes are assumed as downlink subframes for the purpose of this assessment.

TABLE

Downlink Capacity Gain for flexible TDD configurations

| UL/DL configuration FM vs m | Max # of DL subframes in flexible TDD config | Max # of DL subframes in static TDD config | Max DL capacity gain Fm vs m |
| --- | --- | --- | --- |
| F0 vs 0 | 5.28 | 3.28 | +~61% |
| F1 vs 1 | 7.28 | 5.28 | +~38% |
| F2 vs 2 | 8.28 | 7.28 | +~14% |
| F3 vs 3 | 7.64 | 6.64 | +~15% |
| F4 vs 4 | 8.64 | 7.64 | +~13% |
| F5 vs 5 | 8.64 | 8.64 | ±0 |
| F6 vs 6 | 6.28 | 4.28 | +~47% |

As apparent, there is no downlink capacity improvement for flexible TDD configuration F5, which is logical since there is no flexible subframe in the flexible TDD configuration F5. However, this is no loss for the system, since the main benefit of flexible subframes is to adapt to downlink traffic needs by adding additional downlink capacity through dynamic downlink subframes; flexible/static TDD configuration 5 already provides the maximum TDD downlink capacity, with the assumption that one subframe per radio frame is required to be uplink for transmitting corresponding ACK/NACK feedback in the uplink which is vital for the HARQ functionality and corresponding capacity gains related thereto.

Considering the downlink capacity gains of the above table, another variant of the first embodiment does not define seven flexible TDD configurations as assumed so far, but only one or more flexible TDD configurations where the downlink capacity gain is maximum. For example, only the flexible TDD configurations F0 and/or F6 and/or F1 and/or F3 and/or F2 and/or F4 could be defined and used. Correspondingly, this subset of flexible TDD configuration(s) provides the largest potential gain relative the corresponding static TDD configuration, and can also most easily accommodate flexible subframes without affecting legacy UE measurements, as mentioned (they start out with a balanced or slightly uplink-biased TDD configuration).

So far, different definitions of flexible TDD configurations are presented and the various advantages are explained. In the following, it will be explained how the mobile station and base station can determine and control the use of any of the above-described flexible TDD configurations. Again, for illustration purposes the set of flexible TDD configurations according to FIG. 10 is assumed.

According to one variant of the first embodiment, it may be assumed that the flexible TDD configurations are predefined in the UEs and eNodeBs, in a similar manner as done for the static TDD configurations. Put differently, the UE and eNodeB already have stored in a memory information on the flexible TDD configurations and the particular subframe type definitions given by the flexible TDD configurations. The eNodeB may thus select among the various flexible (and static) TDD configurations the one to be used in the future, and, provided that the eNodeB decides that a flexible TDD configuration is to be used for communication, it may provide to the UE a corresponding indication identifying the particular decided flexible TDD configuration to be used. The decision by the eNodeB to change to a flexible TDD configuration and the selection by the eNodeB as to which particular flexible TDD configuration to use, may be based on various parameters, but is not further specified, since it is not the focus of the present invention.

Upon receiving the indication, the UE will in turn gather the corresponding information on the indicated flexible TDD configuration from its memory, and use the indicated flexible TDD configuration for its further communication. The indication of the particular flexible TDD configuration can be either transmitted/broadcast to all UEs of a cell, or may be transmitted specifically to only a subset of at least one UE of a cell.

As explained in the Background section, the static TDD configuration may be indicated by a TDD-config parameter in SIB1 to all UEs in a cell. Similarly, in one variant, a separate parameter flexTDD-config can be defined in SIB1 to carry the indication as to which flexible TDD configuration to be used. Alternatively, the TDD-config parameter already defined for identifying the particular static TDD configuration can be reused or extended to be able to identify the further flexible TDD configurations.

In any case, the eNodeB may directly indicate the flexible TDD configuration to the UE by using an appropriate identifier able to distinguish the various different flexible (and static) TDD configurations.

UEs that do not support the use of a flexible TDD configuration (e.g. legacy UEs) may simply ignore the instruction and proceed with communicating according to the current static TDD configuration.

Another variant of the first embodiment for controlling the use of the flexible TDD configuration assumes that the flexible TDD configurations match corresponding static TDD configurations except for the flexible subframe(s), as explained in connection with FIG. 8-10. Due to the correspondence between a static TDD configuration m and the flexible TDD configuration Fm, only the value of m needs to be configured and signaled to the UE (which performs communication according to the static TDD configuration m), but no second TDD configuration parameter Fm is required to be separately signaled for the flexible TDD configuration, as it is sufficient for the UE to know whether the configuration m should be interpreted as static (i.e. using configuration m) or as flexible (i.e. using configuration Fm). Hence the control signaling overhead can be reduced compared to available solutions that require the explicit signaling of a flexible TDD configuration on top of the signaling of a static TDD configuration.

In this particular variant, the UE and eNodeB do not hold information on the flexible TDD configuration, but merely store the static TDD configuration; then, upon indication from the eNodeB, the UE may derive the particular flexible TDD configuration from a corresponding stored static TDD configuration, as will be explained in detail below.

Again, control of the use of flexible and static TDD configuration is at the eNodeB, which assumedly is communicating with the UE using a static TDD configuration. The eNodeB at some point may decide to use (at least for one UE) a flexible TDD configuration instead of the static TDD configuration that is currently used. The decision of the eNodeB can be based on various parameters, and shall not be further discussed in detail, since it is not the focus of the present invention.

It is assumed for the following explanation that the static TDD configuration currently used shall be made flexible, e.g. instead of static TDD configuration m (e.g. m=0) using flexible TDD configuration Fm (e.g. Fm=F0). In said particular case, it is sufficient for the eNodeB to transmit an indication to the UEs instructing to make the current static TDD configuration flexible; the corresponding indication could be implemented for example by an on/off parameter that is transmitted to a UE or to a group of UEs in a dedicated or broadcast message, or for example by means of the presence or non-presence of a parameter in a configuration message.

Alternatively, if the eNodeB considers it beneficial to use another flexible TDD configuration not based on the current static TDD configuration, it needs to change the static TDD configuration in addition to instructing the UE(s) to make the TDD configuration flexible.

Since the UE does not have the direct information on how the flexible TDD configuration defines the subframes, the UE derives same from the static TDD configuration by applying the above-mentioned requirements on each subframe of the static TDD configuration, and by changing the subframe type to flexible for the subframes fulfilling the requirements. In the particular example of flexible TDD configurations of FIG. 10, the UE performs an algorithm such that it changes the subframe type of a subframe n of a radio frame to flexible, such that the following requirements are fulfilled. A subframe n can only be a flexible subframe $n_{flex}$ if:

subframe $n_{flex}-1$ is a special or uplink subframe,
  subframe $n_{flex}+1$ is a downlink or special subframe, and
  subframe n of the corresponding static TDD configuration is an uplink subframe, where $n=n_{flex}$.

The eNodeB does the same and equally derives the flexible TDD configuration to be used from a corresponding static TDD configuration by applying the corresponding algorithm. In any case, both the UEs and the eNodeB derived a particular flexible TDD configuration (e.g. one of flexible TDD configurations F0-F6 of FIG. 10) and use same for communicating.

Figure 11:
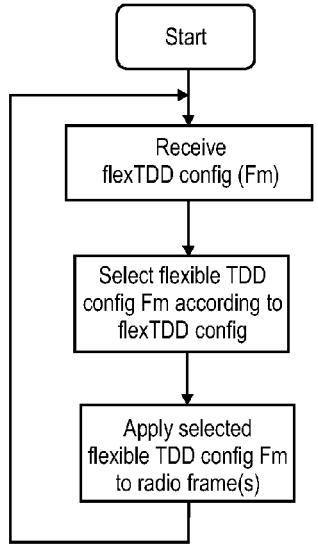
FIGS. 11 and 12 are flow diagrams for processing in the UE relating to how a flexible TDD configuration can be indicated by the eNodeB, according to two alternative embodiments.
Figure 12:
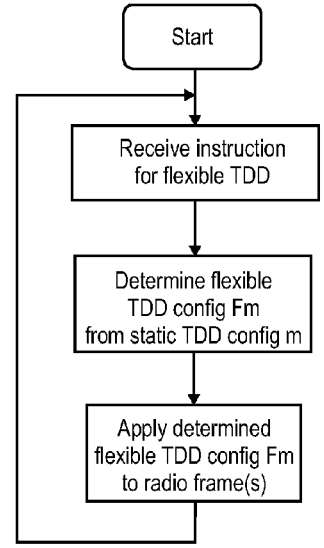

These two variant are illustrated in the flow diagrams of FIGS. 11 and 12, which show the corresponding processes in the UE in order to change to a flexible TDD configuration upon an appropriate indication, where the step of "determine flexible TDD config Fm from static TDD config m" preferably follows one of the requirements according to one of the above variants of the first embodiment.

Second Embodiment

The second embodiment of the invention deals with the determination of whether a flexible subframe is used as a downlink or uplink subframe. This second embodiment shall be regarded independent from the first embodiment, since the concept of how a flexible subframe is actually used, i.e. for downlink or uplink, is independent from the concept of how exactly a flexible TDD configuration is defined and indicated. Of course, the first and second embodiments may also be used in any combination.

For the proper use of a flexible TDD configuration and for taking maximum advantage of the flexible subframes, it is important that the UE and the eNodeB have the same understanding of how a particular flexible subframe is to be used. This helps to avoid a waste of resources, in those cases where the UE and the eNodeB (want to) use the flexible subframe differently. In general, an explicit indication by the eNodeB to the UE or an implicit agreement on both sides may allow having the same flexible subframe understanding. Several variants thereof will be explained in the following.

Overall, once the particular use of a flexible subframe is decided, the UE and eNodeB may use the flexible downlink/uplink subframe as any of other non-flexible downlink/uplink subframes. Correspondingly, the UE shall have a downlink grant (PDCCH or EPDCCH, DCI Format 1, 1A, 1B, 1C, 1D, 2, 2A, 2B, 2C, 2D) to receive a downlink transmission in a flexible downlink subframe, and shall have received previously a corresponding uplink resource assignment that grants the UE resources in the flexible uplink subframe to perform an uplink transmission.

According to a first implicit variant, for each flexible subframe separately, the UE and eNodeB determine whether any uplink transmissions from the UE are pending for said flexible subframe. In a more general variant, it can also be said that the UE and the eNodeB determine whether any uplink transmission opportunity is pending for said flexible subframe, the difference being that the eNodeB might not be able to know beforehand whether the UE actually will take the uplink transmission opportunity at the flexible subframe for transmitting an uplink transmission, e.g. at an SPS-scheduled resource of the flexible subframe.

If at least one uplink transmission (opportunity) is supposed to be transmitted by the UE in the flexible subframe, the corresponding flexible subframe shall be used as an uplink subframe, which gives the UE the opportunity to actually transmit the pending uplink transmission, as well as other uplink transmissions (e.g. dynamically scheduled by the eNodeB, knowing that said particular flexible subframe will be usable for an uplink communication). Conversely, if no uplink transmission is pending for a flexible subframe, said flexible subframe can be determined to be usable as a downlink subframe; the eNodeB can schedule downlink transmissions to the UE in said flexible subframe.

The UE directly knows (amongst others from the specified timing relations for data transmissions, hybrid automatic repeat request (HARQ) feedback, and its own transmission status such as its uplink buffer status or synchronization status, together with the detected dynamic, semi-persistent or periodic scheduling assignments) whether an uplink transmission is pending for a flexible subframe or not. The eNodeB on the other hand may not know for sure all of the pending uplink transmissions, but may only know some of them. For others, the eNodeB may only be aware of other potential uplink transmission opportunities that may fall on a flexible subframe. This will be discussed in more detail with regard to the following non-exhaustive examples of pending uplink transmissions.

Figure 13:
FIG. 13 illustrates the HARQ ACK/NACK/DTX feedback timing in the uplink for the static TDD configurations 0-6 similar to FIG. 5, additionally illustrating as hatched boxes the flexible subframes exemplary for the flexible TDD configuration of FIG. 10.

As explained in the Background Section, HARQ is applied in the downlink as well as the uplink, for which reason also the UE is supposed to transmit a HARQ uplink feedback (ACK/NACK/DTX) to the eNodeB for a downlink transmission received previously by the UE; such feedback is transmitted by the UE either on PUCCH or PUSCH. The particular HARQ feedback timing according to 3GPP LTE is given exemplary in FIG. 5. FIG. 13 is based on FIG. 5 and additionally illustrates the flexible subframes according to the flexible TDD configuration of FIG. 10. As can be seen from FIG. 13, there actually might be HARQ feedback pending for transmission in a flexible subframe. The UE knows of course about any pending uplink transmission due to HARQ feedback, and also the eNodeB knows the timing relationship of FIG. 5 for HARQ feedback and thus knows when to expect HARQ feedback from the UE, and thus may determine when a HARQ feedback is pending for transmission in a flexible subframe and when not.

Another pending uplink transmission could be a channel state information (CSI) report that is either transmitted regularly (e.g. periodically) from the UE to the eNodeB or is scheduled individually by the eNodeB. In both cases, the UE and the eNodeB know beforehand whether a CSI report is configured/scheduled for a flexible subframe or not, and thus the same understanding can be achieved between the UE and the eNodeB.

Another pending uplink transmission could be an uplink data transmission scheduled according to a semi-persistent allocation. Semi-persistent allocations allow a UE to regularly use particular resources for uplink transmissions; the semi-persistent allocation can be changed or released by the eNodeB. Since it is the eNodeB that configures a semi-persistent allocation for a UE, the eNodeB generally knows beforehand when a semi-persistently allocated resource falls on a flexible subframe. Even if the UE has nothing to transmit, it will transmit dummy data to the eNodeB using the SPS resource. What the eNodeB does not know beforehand is whether the semi-persistently allocated resource is still used by the UE, since the UE might implicitly release the configuration for the semi-persistent allocation, without informing the eNodeB. Such an implicit release is performed by the UE after sending only padding data for a specific number of SPS transmissions, and is specified in detail in TS 36.321 v11.2.0 at the end of chapter 5.10.2 as clearing the configured uplink grant.

Another pending uplink transmission can be a sounding reference symbol (SRS) configured by the eNodeB to be transmitted by the UE regularly or based on an explicit trigger. The eNodeB configures a cell-specific parameter indicating one out of a plurality of subframe sets in which SRS may be transmitted in each radio frame. A UE can then be triggered to transmit an individual SRS, or it can be configured to transmit SRS periodically with a configured periodicity taking the cell-specific parameter into account. More details can be found in LTE—The UMTS Long Term Evolution—From Theory to Practice, Edited by Stefanie Sesia, Issam Toufik, Matthew Baker, chapter 16.6, especially sections 16.6.1 and 16.6.2. Thus, the UE as well as the eNodeB know beforehand the subframe used for sending a sounding reference symbol, and can thus easily determine when a sounding reference symbol is pending for a flexible subframe and when not.

Another pending uplink transmission may be scheduling requests transmitted by the UE to the eNodeB to request uplink resources. In case the UE needs to transmit user data in the uplink and no SPS allocation or other allocations are available for an uplink transmission, the UE can transmit a scheduling request with information on what is to be transmitted, and the scheduler of the eNodeB can consider the scheduling request of the UE and may then provide (if possible) a dynamic uplink resource allocation to the UE. The UE cannot transmit a scheduling request at any time, but has particular configurable opportunities to transmit scheduling requests. Therefore, although the eNodeB cannot know exactly when the UE will indeed transmit a scheduling request, the eNodeB knows the scheduling request opportunities available for the UE in said respect, and can thus determine when a scheduling request opportunity is in a flexible subframe and when not. Therefore, to be on the safe side, the eNodeB will assume that every scheduling request opportunity available to the UE may be potentially used for a scheduling request; i.e. any flexible subframe with a scheduling request opportunity, independently from whether the UE actually sends a scheduling request or not, is considered an uplink subframe. The UE of course behaves in a corresponding manner, by considering a flexible subframe for which a scheduling request opportunity is available, as an uplink subframe; even in view of the UE already knowing sufficiently in time that no scheduling request is indeed pending. In a further embodiment explained later, this will be treated differently.

Another potential pending uplink transmission is a random access message with which the UE can achieve uplink synchronization (when lost by the UE, or at the beginning of a communication), or to connect to a base station or request transmission resources. Similar to the scheduling requests, the UE may not transmit random access message at any time, but has particular opportunities in said respect. Therefore, although the eNodeB cannot know exactly when the UE will indeed transmit a random access message, the eNodeB knows the opportunities the UE has for doing so. Therefore, to be on the safe side, the eNodeB will assume that every opportunity available to the UE to transmit a random access message is indeed used (even if not); i.e. any flexible subframe with a random access opportunity, independently from whether the UE actually sends a scheduling request or not, is considered an uplink subframe. The UE behaves correspondingly, such that both the UE and the eNodeB make the same determination in said respect. In a further embodiment explained later, this will be treated differently.

Still another potential pending uplink transmission is an uplink user data transmission that is dynamically scheduled by the eNodeB. The eNodeB might have provided a dynamic uplink resource allocation to the UE, granting resources on a flexible subframe, for instance by using DCI of one of the Formats 0 or 4 as appropriate. In the current 3GPP LTE system the timings for receiving uplink resource assignments is predefined for the various static TDD configurations. FIG. 14 is based on this 3GPP-standardized uplink resource assignment timing and illustrates when the uplink resource assignments are expected, which grant uplink resources in the flexible subframe, as defined by the flexible TDD configurations of FIG. 10. It is assumed that the same timings for receiving uplink resource assignments as defined in 3GPP for static TDD configurations are used as well for the flexible TDD configurations.

For instance, in TDD configuration 0, the uplink resource assignment for granting uplink resources in subframe n=4 is expected in subframe 0, i.e. four subframes before; for TDD configuration 6 however, the relation between the uplink resource assignment and the corresponding subframe n=4 for which the uplink resource assignment is intended is different, namely five subframes before. These timing relations defined for static TDD configurations m shall also be used for the corresponding timing relations for flexible TDD configurations Fm.

As can be seen from FIG. 14, whether a PUSCH transmission is indeed pending in a flexible subframe due to a dynamic resource allocation is always known after the reception of uplink resource allocations that occur at least four subframes prior to the flexible subframe; this leaves the UE sufficient time to process the uplink resource allocation and determine that the flexible subframe is to be used as an uplink subframe. Also, although the dynamic uplink resource assignment is now described in the context of the implicit agreement, it may be regarded as an explicit indication as well, and will accordingly be treated again later.

Instead of implicitly having the same understanding of how the flexible subframe is to be used, it is also possible to have an explicit control of the flexible subframes in a radio frame, according to a further variant of the second embodiment. In particular, due to the undetected errors in configuration messages (e.g. for SPS or CSI reports), or due to an unknown latency in the UE between the reception of configuration messages and using of same, or due to resource assignments for an uplink transmission missed by the UE, or in case that the UE erroneously detects a resource assignment for uplink transmissions even though no such resource assignment was transmitted by the eNode; in all those cases and of course further cases, the UE and the eNodeB may have a different understanding on how particular flexible subframes should be treated. In addition, as has been described above, the eNodeB is not able to foresee for every kind of potential uplink transmission whether an uplink transmission will indeed take place; for example, regarding scheduling requests, random access messages, or SPS-scheduled uplink transmissions; which thus leads to even less opportunities of using a flexible subframe as a downlink subframe An explicit use indication for a flexible subframe can thus be advantageous. Preferably, this is controlled by the eNodeB, which transmits a particular instruction to the UE as to how the flexible subframe should be used, i.e. as an uplink or downlink subframe.

According to a first variant, the eNodeB transmits a DCI Format 0 (or alternatively of Format 4, or any other DCI Format that can indicate an uplink resource assignment) to the UE, scrambled and transmitted in a special way such that the UE can derive therefrom how a flexible subframe is to be used. DCI Formats 0 and 4 schedule uplink resources for a UE, as explained above in connection with FIG. 14. The following explanation of this variant will focus on DCI Format 0, however applies similarly for DCI Format 4 or other DCI Formats than can indicate an uplink resource assignment. In particular, the eNodeB transmits a DCI Format 0 as if it would grant uplink resources for the UE in the flexible subframe. Put differently, the DCI Format 0 is transmitted according to the uplink resource allocation timing as discussed in connection with FIG. 14. For a usual uplink resource assignment, the DCI Format 0 (or more specifically, the CRC of the DCI Format 0) is scrambled with the C-RNTI (or with the SPS-C-RNTI, in case of semi-persistent scheduling), which identifies the UE and allows the UE to determine that the uplink resource assignment is indeed intended for itself. In this variant however, instead of using the UE-specific C-RNTI, the eNodeB scrambles the CRC of the DCI Format 0 with a common RNTI, such as the Paging-RNTI, the System Information-RNTI, the Random Access-RNTI or the Multimedia Broadcast Multicast Service-RNTI. These RNTIs are not UE-specific but common to a set or all UEs of a cell. Still alternatively, a specific RNTI may be reserved for the flexible subframe use indication. For example, in case an RNTI structure as given in the Table of the Background section is reused, preferably one or more values from the range FFF4-FFFC labelled as "reserved for future use" can be taken in said respect.

Therefore, a DCI Format 0 scrambled in such a manner is not treated by a UE as a normal uplink resource assignment. The use of any of the common RNTIs (or the new RNTI) will cause no backward compatibility problems, since the usage of a common RNTI for scrambling the CRC of a DCI format that can indicate uplink resource assignments does not have any specified meaning so far, but is rather subject of an aspect of the current invention.

Furthermore, instead of transmitting the DCI Format 0 in a UE-specific search space, the eNodeB transmits the specially-scrambled DCI Format 0 in the common search space, such that all UEs in a cell can receive same.

The DCI Format 0 usually comprises an uplink resource allocation, usable for the corresponding subframe. In one alternative, the uplink resource allocation indicated by the DCI Format 0 may actually be used as a valid uplink resource allocation; and the UE can use the uplink resource allocation for transmitting in the uplink at the flexible subframe. However, since said DCI Format 0 would be preferably received by several UEs, this might result in too much interference, when all UEs behave the same and transmit in the uplink at the flexible subframe.

Therefore, according to another alternative, the DCI Format 0 indicates an invalid value for the resource allocation, or the bits that represent the resource assignment carry a predefined value in this case. This improves the error resilience, since the UE may further check whether the specially scrambled and transmitted DCI Format 0, indicates a valid or invalid resource allocation, or matches the predefined value, as applicable. Only in case it indicates an invalid resource allocation, or matches the predefined value, as applicable, the UE determines that the corresponding flexible subframe is to be used as an uplink subframe. In said case, a separate uplink resource assignment for said flexible uplink subframe may be received in a usual manner (e.g. DCI Format 0 scrambled with C-RNTI of a particular UE), to allocate resources to a particular UE to transmit in the uplink.

Since DCI Format 0 of above does not really encode an uplink resource assignment used for an actual uplink transmission, the transmit power control command (TPC command for PUSCH) included in said DCI Format 0 is meaningless too. Therefore, to further increase error resilience the corresponding power control adjustment for PUSCH of DCI Format 0 can be set to a predefined value, e.g. the respective bits are set to 0. In such a case, the UE may preferably assume the power control adjustment to be 0 dB.

If the eNodeB decides that a particular flexible subframe is to be used as an uplink subframe, it transmits such a specially-scrambled DCI Format 0, so as to explicitly inform the UE in said respect. Conversely, the eNodeB will not transmit such a DCI Format 0.

When a UE receives a DCI Format 0, scrambled and transmitted as just explained, it may determine that the flexible subframe is to be used as an uplink subframe; correspondingly, in the absence of such a DCI Format 0 transmission, it will determine that the flexible subframe is to be used as a downlink subframe. The eNodeB can thus explicitly indicate the use of a particular flexible subframe, by transmitting a special DCI Format 0 to the UE.

In addition, if the DCI Format 0 is scrambled with a common RNTI and transmitted in the common search space, it is possible for the eNodeB to reach all (or a subset) of UEs in a cell, which according to the instruction all determine that the flexible subframe is downlink or uplink.

Alternatively to the use of the DCI Format 0 (or 4) as explained above, the eNodeB might reuse a DCI Format that can indicate a downlink resource allocation, such as Format 1, 1A, 1B, 1C, 1D, 2, 2A, 2B, 2C, 2D, to explicitly instruct the UE how to use a flexible subframe. For ease of illustration, the Format 1A is assumed in the following, although the following applies in a similar manner to the other DCI Formats too.

Usually, a downlink resource assignment is transmitted in the same subframe at which the corresponding downlink transmission is performed; in contrast to uplink resource assignments, which are received at least 4 subframes ahead (see above discussion and FIG. 14). This timing would not allow a UE to determine in a timely manner the use of a flexible subframe. Therefore, according to this variant, the DCI Format 1A is transmitted at the timing of an uplink resource assignment, i.e. at a subframe, at which the UE would receive an uplink resource allocation granting resources for the flexible subframe, as exemplified in FIG. 14. For instance, assuming the flexible TDD configuration 0 and the flexible subframe with index 4, the DCI Format 1A is transmitted in subframe with index 0.

In addition, the DCI Format 1A (or more specifically the CRC of DCI Format 1A) is scrambled with one of the common RNTIs, such as the Paging-RNTI, the System Information-RNTI, the Random Access-RNTI or the Multimedia Broadcast Multicast Service-RNTI. These RNTIs are not UE-specific but common to a set or all UEs of a cell. It should be noted however that according to 3GPP standard operation DCI Format 1A can be scrambled with some of these common RNTIs (e.g. for transmission of system information on the assigned PDSCH resources), for which reason the scrambling with one of these common RNTIs does not suffice to distinguish the DCI Format 1A from a "usual" DCI Format 1A for a usual downlink resource assignment. In those cases, the resource assignment indication should be made invalid so as to facilitate said distinction. Consequently, the UE will further check whether the specially-scrambled and specially-transmitted DCI Format 1A also indicates an invalid value for the downlink resource allocation, and only if it finds such an invalid value for the downlink resource allocation, the UE will consider the DCI Format 1A for determining the use of the flexible subframe as a downlink subframe.

Alternatively, a specific RNTI may be reserved for the flexible subframe use indication. For example, in case of an RNTI structure as given in the Table of the Background section is reused, preferably one or more values from the range FFF4-FFFC labeled as "reserved for future use" can be taken in said respect. The use of any of the common RNTIs (or the new RNTI) will cause no backward compatibility problems. In said particular case, it is not necessary to indicate an invalid resource assignment; but, in order to increase error resilience it would be also possible to still provide such an invalid indication for the resource assignment; or even a predefined indication for the resource assignment, such as all bits set to 0.

Furthermore, instead of transmitting the DCI Format 1A in a UE-specific search space, the eNodeB preferably transmits the specially-scrambled DCI Format 1A in the common search space, such that all UEs in a cell can receive same.

Since DCI Format 1A of above does not really encode a downlink resource assignment used for an actual transmission, no corresponding HARQ feedback is expected, and therefore the transmit power control command (TPC command for PUCCH) included in said DCI Format 1A is meaningless too. This transmit power control command is usually used for adjusting the power for the corresponding HARQ feedback in connection with the downlink transmission of the DCI Format 1A. To further increase error resilience however, the corresponding power control adjustment for PUCCH of DCI Format 1A can be set to a predefined value, e.g. the corresponding bits are set to 0. In such a case, the UE may assume the power control adjustment to be 0 dB.

If an eNodeB decides that a particular flexible subframe is to be used as a downlink subframe, it transmits such a specially-scrambled DCI Format 1A, to explicitly inform the UE in said respect. Conversely, the eNodeB will not transmit such a DCI Format 1A, if the eNodeB decides that the flexible subframe should be used as an uplink subframe. The UE, receiving such a specially scrambled and transmitted DCI Format 1A, accordingly identifies the flexible subframe to which the special DCI Format 1A refers (based on the timing relation for an uplink resource allocation) and then determines that the flexible subframe shall be used as a downlink subframe. Accordingly, the UE will expect a DCI carrying with a further downlink resource allocation in the flexible subframe, and the corresponding downlink transmission in the flexible subframe. Correspondingly, in the absence of such a DCI Format 1A transmission, the UE will determine that the corresponding flexible subframe is to be used as an uplink subframe. The eNodeB can thus explicitly indicate the use of a particular flexible subframe, by transmitting a special DCI Format 1A to the UE.

In the above two variants it has been assumed that in the absence of the special DCI Format 0/1A, the UE may determine that the flexible subframe is to be used as downlink/uplink. Instead however, the two above variants may be combined in such a manner that e.g. the DCI Format 0 would explicitly indicate a flexible uplink subframe, and the DCI Format 1A would explicitly indicate a flexible downlink subframe. A lack of explicit indication(s) may furthermore preferably be interpreted by the UE to treat the flexible subframe in the same fashion as it is defined in the corresponding static TDD configuration m.

For the said approach of explicitly indicating the usage of a flexible subframe by means of a DCI scrambled by a common RNTI, it is advantageous to use DCI Format 0 and DCI Format 1A since they have the same size (see Table: DCI Formats in Background section), and thus may be easily detected by the UE during the blind decoding. In addition, DCI format 0 is detected by UEs regardless of their configured uplink transmission mode, and likewise DCI format 1A is detected by UEs regardless of their configured downlink transmission mode (cf. 3GPP TS 36.213 v11.2.0, section 8.0 and section 7.1, respectively).

In a variant to the above embodiments, the usage of the flexible subframe is made for all flexible subframes within a radio frame (or alternatively, for any 5 ms or 10 ms period). In this variant, the UE determines the usage of the first flexible subframe as downlink or uplink according to one or more of the embodiments. The usage of the first flexible subframe then equally determines the usage of the other flexible subframes within the radio frame (or said period). For example assuming configuration F0 as shown in FIG. 10, if the UE detects that subframe 4 is used as uplink, it therefrom determines that also subframe 9 is used as uplink. Such an approach can reduce the overhead involved for the indication of using the flexible subframes, and may furthermore simplify the resource management at the network side without losing too much flexibility, as the validity of the determination would not exceed a 10 ms period. In addition, it can simplify the processing at the UE side e.g. for HARQ feedback reporting, since for a second flexible subframe the UE will know even earlier whether it is used for downlink or uplink.

According to a further improvement, and assuming that a flexible subframe is determined to be used for downlink, the DCI Format 1A (or any of the other downlink resource assignment formats) received in the flexible downlink subframe for the respective downlink transmission in the flexible downlink subframe may carry reserved values in the TPC command for PUCCH, such that the UE can verify these reserved values to further improve the detection of an erroneously received DCI. This is particularly advantageous for DCIs received in flexible subframes if the corresponding HARQ feedback is transmitted together with HARQ feedback corresponding to non-flexible downlink subframes. An example derived from FIG. 15 would be in configuration F1, where the HARQ feedback for flexible subframe 18 is transmitted together with the HARQ feedback for non-flexible downlink subframes 14, 15, 16 in non-flexible subframe 22. Since the DCI carrying downlink resource assignments in those non-flexible downlink subframes already each carry TPC commands for PUCCH, and these would affect the same PUCCH (in the example in subframe 22), a further power adjustment from the DCI assigning downlink resources and received in a flexible subframe is not strictly required, and consequently the corresponding field in the DCI can be reserved or set to predefined values such as the bits are 0. The UE should preferably treat the corresponding power control adjustment as 0 dB.

According to a variant of this embodiment, a special subframe $n_{flex}-1$ is changed to a downlink subframe if the subsequent flexible subframe $n_{flex}$ is used for downlink. As outlined in the Background section, a special subframe n is used to provide a gap when changing from downlink in subframe n−1 to uplink in subframe n+1 at the UE. In case that a flexible subframe is preceded by a special subframe, and said flexible subframe is used for downlink, there is no motivation to provide such a gap in the preceding subframe. Whether the flexible subframe is used for uplink or downlink is, according to other aspects of this invention, known after reception of the DCI at least 4 ms prior to the respective flexible subframe, and consequently at least 3 ms prior to the respective special subframe. Therefore there is sufficient time for the UE to adapt its understanding and change such a special subframe $n_{flex}-1$ to a downlink subframe, which increases the downlink capacity and therefore allows a higher throughput. This variant can be easily exemplified regarding flexible downlink configuration F2 according to FIG. 10, which is given as DSUDDDSFDD. In case the flexible subframe $n_{flex}=7$ is used for downlink, subframe $n_{flex}-1=6$ is changed to a downlink subframe. In case the flexible subframe $n_{flex}=7$ is used for uplink, subframe $n_{flex}-1=6$ is used as a special subframe. Consequently, depending on the determined usage of the flexible subframe, flexible TDD configuration F2 would be used as DSUDDDDDDD (as configuration 5) or as DSUDDDSUDD (as in configuration 2), which may change from radio frame to radio frame. Evidently a usage as DSUDDDDDDD provides more downlink capacity than a usage as DSUDDDSDDD.

Further Embodiment

These further embodiments of the invention relate to the question of how to handle uplink transmissions that would be transmitted in a flexible subframe. Although these embodiments are closely related to the first and second embodiments explained above, they shall be nonetheless treated mostly separately and independently from the various first and second embodiments. Most of the processes and concepts explained in the following do not need a particular flexible TDD configuration to work, or a particular determination of a flexible downlink/uplink subframe; rather, these concepts can applied universally in the context of flexible TDD configurations. Still of course, the following embodiments can be used in any appropriate combination with the first and second embodiments.

As explained in the context with the second embodiment, there may be various different types of uplink transmissions that may be potentially pending for flexible subframe. For one variant of the second embodiment, a pending uplink transmission for a flexible subframe automatically determines the flexible subframe to be uplink, thus preventing flexible subframes to be used for downlink; which is disadvantageous since the purpose of the flexible TDD configurations is to maximize downlink capacity. Also, in case the flexible subframe shall be determined to be used for downlink (irrespective of whether an uplink transmission is pending or not), it is beneficial to define a different handling of those uplink transmissions that would fall onto the flexible subframes.

One embodiment relates to the handling of the HARQ ACK/NACK/DTX feedback such that the HARQ ACK/NACK/DTX feedback, pending for a flexible subframe, is transmitted in another non-flexible uplink subframe. As apparent from FIG. 13 for every flexible subframe there could be at least one HARQ feedback pending. Put differently, using the standard HARQ feedback timing of the static TDD configuration also for the flexible TDD configuration would result in that a HARQ feedback could be transmitted in all flexible subframes, assuming that all corresponding downlink subframes were actually used for a downlink transmission which would trigger a HARQ feedback in the flexible subframes. This might even result in the case that no flexible subframe is actually usable as downlink subframe, since the flexible subframes are "blocked" by the HARQ uplink feedback.

Consequently, the HARQ feedback must be transmitted in uplink subframes, i.e. not in a flexible subframe. Accordingly, a different HARQ feedback timing is to be defined for the flexible TDD configurations, such that the HARQ feedback is never to be transmitted in the flexible subframes. This would facilitate the use of flexible subframes as flexible downlink subframes. According to a particular embodiment, the HARQ feedback timings as standardized for the static TDD configurations (see FIG. 5) are reused for defining new HARQ feedback timings for the flexible TDD configurations. In more detail, for each flexible TDD configuration one of the various HARQ feedback timings for the static TDD configuration is selected, such that the HARQ uplink feedback is not timed for a flexible subframe. This broad concept will now be exemplified based on the flexible TDD configurations of FIG. 10, but is equally applicable to other flexible TDD configurations.

A HARQ feedback timing for all the flexible TDD configurations is associated with the HARQ feedback timings of the static TDD configurations according to the following table.

TABLE

HARQ feedback timing for flexible TDD

| ACK/NACK Timing applied to Flexible Uplink-downlink configuration Fm | ACK/NACK Timing defined for non-Flexible Uplink-downlink configuration p |
|---|---|
| F0 | 1 |
| F1 | 2 |
| F2 | 5 |
| F3 | 4 |
| F4 | 5 |
| F5 | 5 |
| F6 | 2 |

In other words, instead of defining complete new HARQ feedback timings for the flexible TDD configurations, it is advantageous to merely associate each of the flexible TDD configuration with one appropriate HARQ feedback timing of the static TDD configuration, so as to achieve the result that the HARQ feedback is not timed for flexible subframes. This avoids a separate ACK/NACK timing configuration message, thereby avoiding an increase of control signaling overhead.

FIG. 15 illustrates the result of the above table, and in particular the HARQ feedback timings for the seven flexible TDD configurations as defined by FIG. 10. As can be appreciated, the HARQ feedback is timed differently, in a manner that the HARQ feedback is transmitted to the eNodeB in an uplink subframe, other than the flexible subframe. For instance, assuming flexible TDD configuration F0, the HARQ uplink feedback for subframe 20, previously timed for flexible subframe 24, is now transmitted in uplink subframe 27.

This however leads to a further problem that may be mitigated by the following embodiment. As can be seen from FIG. 15, and e.g. for flexible TDD configuration F1, subframe 22 would be used to transmit the HARQ feedback for potential downlink data transmissions in subframes 14, 15, 18 and 16; likewise subframe 27 would be used to transmit the HARQ feedback for potential downlink data transmissions in subframes 19, 20, 23, 21. However, subframes 18 and 23 are actually flexible subframes; in case the flexible subframe is used as a downlink subframe and a downlink transmission is performed in these subframes, the HARQ feedback can be transmitted as usual.

However, in case the flexible subframe is determined to be an uplink subframe, there is no downlink transmission occurring in the flexible subframe. In any case, for a flexible uplink subframe, the usage of the HARQ uplink feedback is thus not meaningful. Still, according to usual HARQ feedback timing and usage, a HARQ feedback is also to be transmitted for a flexible uplink subframe; in this context, please refer to 3GPP TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 10.1.3.1 TDD HARQ-ACK procedure for one configured serving cell and the corresponding tables 10.1.3-2 to 10.1.3-7. This is especially true if the feedback for a flexible subframe is transmitted together with HARQ feedback for other subframes; for instance, the HARQ feedback for flexible subframes 13, 18, is transmitted together respectively with three other HARQ feedbacks.

The preferred handling of such HARQ feedback for flexible uplink subframes is based on the consideration that error cases, or at least their effects, should be minimized. The most adverse effect would be that the UE treats a flexible subframe as a flexible uplink subframe, while the eNodeB uses it as a flexible downlink subframe for transmitting downlink data. The downlink transmission from the eNodeB is not successful, since the UE does not expect and thus does not properly receive the downlink transmission.

According to one embodiment, the UE shall thus transmit a HARQ NACK as HARQ feedback for any flexible uplink subframe. This would give the eNodeB the information that the transmission was not successful and that it should be retransmitted.

In some cases however, especially if HARQ feedback for several downlink transmission is conveyed in the same subframe, a single NACK feedback could require the UE to feedback NACK for all other downlink transmissions as well, in order to be on the conservative side such that rather excessive retransmissions are prompted instead of losing a required re-transmission.

Therefore, according to a further embodiment, the UE shall provide a HARQ DTX as HARQ feedback for any flexible uplink subframe. HARQ DTX is used already in LTE Release 11, e.g. for a case when there is a downlink subframe without a detected DCI (in other words, where no downlink resource assignment was detected). The HARQ DTX handling can therefore be beneficially employed for the uplink feedback for a dynamic uplink subframe as meaning that the downlink resource assignment was not detected, with the background reason that it was not possible to detect any downlink signals because the UE was transmitting uplink at the time.

In a similar way, the handling of uplink ACK/NACK feedback for dynamic downlink subframes, where no downlink resource assignments were detected should preferably be treated as DTX, or if that it is not available, as NACK.

Another type of uplink transmission that may be potentially pending for flexible subframes is a so-called "non-adaptive retransmission". As explained in the Background Section, the non-adaptive retransmission is employed as of LTE Release 11 (and earlier) for uplink HARQ. For any uplink transmission in a subframe n, the UE expects a downlink ACK/NACK feedback (using a Hybrid ARQ Indication, HI, usually conveyed by PHICH) on a given resource in a subframe n+k (where k is given by the standard and is specific for each TDD configuration). This will be exemplified in the following.

The flexible TDD configuration F1 is assumed for the following explanation. A DCI is transmitted in subframe 4 to schedule a PUSCH transmission in subframe 8 (see FIG. 14). Correspondingly, the UE transmits an uplink transmission (the PUSCH) in subframe 8, and then, according to the HARQ feedback timing (not shown in a figure, but exemplarily defined by 3GPP TS 36.213 v11.2.0 section 9.1.2 and particularly by Table 9.1.2-1 applying the definitions for TDD configuration m therein to flexible TDD configuration Fm), expects the HARQ ACK/NACK downlink feedback for that uplink transmission in subframe 8+6=14. In case the PHICH in subframe 14 carries a HARQ NACK and no new grant is detected by PDCCH or EPDCCH in subframe 14, the UE would autonomously use subframe 18 (i.e. subframe 14+k, according to FIG. 14) to transmit the so-called non-adaptive retransmission.

Now, since we assume that subframes 3, 8, 13, 18, 23, etc. . . . are flexible subframes, the situation in this example would be as follows: Flexible subframe 8 of flexible TDD configuration F1 is a flexible uplink subframe (due to the DCI in subframe 4, triggering the uplink transmission in subframe 8), and flexible subframe 18 is a dynamic uplink subframe (due to PHICH=NACK received in subframe 14, triggering the non-adaptive retransmission in subframe 18).

Furthermore, if the PHICH with the HARQ downlink feedback in subframe 14 is transmitted as ACK, it could mean two things: Firstly, it can mean that the eNodeB might have liked to use flexible subframe 18 as a dynamic downlink subframe to transmit downlink data (to that UE or to others), and will therefore not be able to receive and process the non-adaptive retransmissions that the UE transmits in subframe 18. Secondly, it can mean that the eNodeB operates subframe 18 as a dynamic uplink subframe but does not want the UE to transmit the non-adaptive retransmission—rather the resources should be used by other UEs. Then, in case such a HARQ downlink feedback is received erroneously, i.e. as NACK instead of ACK, the non-adaptive retransmissions would create undesired interference.

To avoid the above-described blocking of the flexible subframes by the non-adaptive retransmission, according to a further embodiment of the invention, the UE shall never transmit non-adaptive retransmissions in flexible subframes. This may be achieved differently, by either ignoring the corresponding HARQ downlink feedback, that would potentially trigger a non-adaptive retransmission in a flexible subframe, or alternatively, by treating all HARQ feedback over PHICH, that would potentially trigger a non-adaptive retransmission in a flexible subframe as HARQ ACK (PHICH=ACK). Both of these ways will allow the UE to leave the flexible subframe free from non-adaptive retransmissions and will allow eNodeB to control the flexible subframe, i.e. whether it is a dynamic downlink or uplink subframe by means of transmitting or not transmitting an uplink resource assignment for a flexible subframe to the UE. The retransmission of the previous transmission can be done using a new DCI in said respect.

Another complication with respect to uplink PUSCH data transmissions and PHICH downlink feedback concerns the feedback for data that is transmitted in a flexible uplink subframe.

In some TDD configurations, the PHICH transmitting NACK for a flexible uplink subframe transmission would trigger a non-adaptive retransmission in a flexible subframe (as in the example above), and the PHICH transmitting NACK for a non-flexible uplink subframe transmission would trigger a non-adaptive retransmission in a subsequent non-flexible subframe.

In some TDD configurations however, the PHICH transmitting NACK for a flexible uplink subframe transmission would trigger a non-adaptive retransmission in a non-flexible subframe, and the PHICH transmitting NACK for a non-flexible uplink subframe transmission would trigger a non-adaptive retransmission in a flexible subframe.

For those configurations, it is preferable that neither a PHICH can trigger a non-adaptive retransmission in a flexible subframe, nor that the PHICH that is transmitted for a transmissions in a flexible uplink subframe can trigger a retransmission in a subsequent non-flexible subframe. Therefore, in a preferred embodiment the UE will handle downlink ACK/NACK as follows:

All ACK/NACK feedback that is expected by the UE as feedback for an earlier uplink data transmission in a flexible subframe is ignored or treated as ACK All ACK/NACK feedback that is expected by the UE and that would trigger an uplink data transmission in a future flexible subframe is ignored or treated as ACK (see above)

For a non-flexible uplink subframe n of a flexible TDD configuration Fm, the timing between the uplink data transmission and the corresponding downlink HARQ feedback is the same as in static TDD configuration m for that uplink subframe n For the timing between a downlink HARQ feedback and a corresponding uplink transmission in a non-flexible uplink subframe n, flexible TDD configuration Fm uses the same timing as static TDD configuration m for that uplink subframe n The effect can be visualized as in FIG. 16; e.g. in the example above for flexible TDD configuration F1 the PHICH in subframe 14 transmitted in the downlink for the PUSCH in subframe 8 would be treated as ACK, regardless of the actual received PHICH value in that subframe. It can be noted that in flexible TDD configuration F0, in subframes 10 and 15 respectively two ACK/NACK would be transmitted on PHICH, one for the uplink transmission of a non-flexible subframe (3 respectively 8) and one for the uplink transmission of a flexible subframe. Even in these cases, only the latter are treated as ACK or are ignored, as applicable. A preferred embodiment of the present invention is therefore to apply the timing between uplink data transmission and corresponding downlink HARQ feedback (HI, usually on PHICH), as well as the timing between a downlink HARQ feedback and a corresponding retransmission, for flexible TDD configuration Fm in the same way as for static TDD configuration m if the respective uplink data transmission subframe is non-flexible.

Other types of uplink transmissions that should be avoided for flexible subframes have been already mentioned in connection with the second embodiment and are the following:

the data uplink transmissions that are scheduled by SPS.
Scheduling requests
Periodic CSI report
Uplink sounding
Random access messages To maintain the flexible subframe as free as possible from these uplink transmissions, they should be suppressed. In other words, in case one of the above uplink transmissions would fall on a flexible subframe, the UE should not perform these uplink transmissions.

Alternatively, according to a further embodiment, any configuration defined for the above-mentioned uplink transmissions, where at least one transmission instance would coincide with a flexible subframe, would be treated by the UE as invalid, and would then be discarded. Correspondingly, no such uplink transmission would happen anymore. However, the eNodeB should provide a new configuration for the discarded configuration, this new configuration considering the flexible subframes such that any of the uplink transmissions would not be performed at a flexible subframe.

In another alternative and beneficial embodiment, any uplink SPS configuration is automatically released by the UE, if the (flexible or static) TDD configuration changes to a flexible TDD configuration where an uplink SPS transmission would coincide with a flexible subframe. Again, the eNodeB should in this case provide a new configuration of uplink SPS, so that the UE can continue using an SPS uplink resource.

In a further embodiment, the usage of a flexible TDD configuration, or equivalently the presence of at least one flexible subframe per radio frame affects the maximum number of downlink HARQ processes. Especially in the case where a flexible TDD configuration Fm contains more downlink+flexible subframes than static TDD configuration m, the UE may be required to adapt its limited memory buffer to more downlink HARQ processes. For static TDD configurations m, 3GPP TS 36.213 v11.2.0 Table 7-1 defines the maximum number of HARQ processes for downlink. In a first preferred embodiment, to determine the maximum number of DL HARQ processes when operating a flexible TDD configuration Fm the number given in Table 7-1 for a static TDD configuration m is increased by one for each flexible subframe defined in flexible TDD configuration Fm. For example, Table 7-1 specifies a maximum of 4 HARQ processes for TDD UL/DL configuration 0. Flexible TDD configuration F0 according to FIG. 10 contains two flexible subframes, so that the maximum number of DL HARQ processes in flexible TDD UL/DL configuration F0 is determined as 4+2=6. In this way, the maximum number of DL HARQ processes in flexible TDD UL/DL configuration F0 to F6 can be found as 6, 9, 11, 10, 13, 15, 8 (respectively).

TABLE

Maximum number of DL HARQ processes for flexible TDD, offset-based

| Flexible Uplink-downlink configuration Fm | Maximum number of HARQ processes |
|---|---|
| F0 | 6 |
| F1 | 9 |
| F2 | 11 |
| F3 | 10 |
| F4 | 13 |
| F5 | 15 |
| F6 | 8 |

In another variant, a comparison is made between the case where as many of subframes as possible are used for downlink in a flexible TDD UL/DL configuration, and comparing these to an equivalent case of a static TDD configuration. Exemplarily, the flexible configurations in FIG. 10 are used replacing each subframe denoted as F by a D, and then comparing the result to FIG. 6. The equivalent configuration as obtained from FIG. 6 is then used to lookup the maximum number of DL HARQ processes according to Table 7-1 from 3GPP TS 36.213 v 11.2.0. In case no direct correspondence is found, the correspondence is established by finding another configuration that provides the same number of subframes usable for downlink; in this way for example, a correspondence between flexible TDD UL/DL configuration F6 (providing at most 5×D+2×S=7 subframes usable for downlink according to FIG. 10) and configuration 3 (according to FIG. 6, providing 6×D+1×S=7 subframes usable for downlink). The result is shown in the following table.

TABLE

Maximum number of DL HARQ processes for flexible TDD, equivalence-based

| Flexible Uplink-downlink configuration Fm | Maximum downlink-equivalent static uplink-downlink configuration | Maximum number of HARQ processes |
|---|---|---|
| F0 | 1 | 7 |
| F1 | 2 | 10 |
| F2 | 5 | 15 |
| F3 | 4 | 12 |
| F4 | 5 | 15 |
| F5 | 5 | 15 |
| F6 | 3 | 9 |

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for communicating between a mobile station and a base station in a communication system based on one out of at least one flexible Time Division Duplex (TDD) configuration,
wherein each of the at least one flexible TDD configuration defines subframes of a radio frame as an uplink subframe, a downlink subframe, a special subframe or a flexible subframe, and defines at least one subframe $n_{flex}$ of the radio frame as a flexible subframe such that subframe $n_{flex}-1$ is a special subframe or an uplink subframe, and
subframe $n_{flex}+1$ is a downlink subframe or a special subframe,
wherein the flexible subframe is selectively usable as a downlink or uplink subframe, the method comprising:

transmitting control information for an uplink resource assignment, from the base station to the mobile station, in a subframe that assigns uplink resources in a flexible subframe; and determining by the mobile station and the base station the flexible subframe is to be used as an uplink subframe, in case a Cyclic Redundancy Check part of the control information for an uplink resource assignment is scrambled with one of: a Paging-Radio Network Temporary Identifier (RNTI), a System Information-RNTI, a Random Access-RNTI, a Multimedia Broadcast Multicast Service-RNTI, and a predefined flexible-TDD-RNTI, wherein the control information for an uplink resource assignment indicates an invalid value of uplink resources, the control information for an uplink resource assignment is a Downlink Control Information (DCI) Format 0 or 4, the control information for an uplink resource assignment is transmitted from the base station in resources of a common search space, and the control information for the uplink resource assignment indicates a predefined power control value for the uplink resource assignment.

2. The method according to claim 1, wherein the communication between the mobile station and the base station is based either on one out of a plurality of static TDD configurations or on one out of the at least one flexible TDD configuration, wherein each of the static TDD configurations defines subframes of a radio frame as an uplink subframe, a downlink subframe or a special subframe, and wherein the at least one flexible TDD configuration defines the subframes of the radio frame as an uplink subframe, a downlink subframe or a special subframe the same as a corresponding static TDD configuration with the exception of further defining the at least one subframe $n_{flex}$ as a flexible subframe, wherein the at least one flexible TDD configuration defines the at least one subframe $n_{flex}$ as a flexible subframe such that subframe n of the corresponding static TDD configuration is an uplink subframe, where $n=n_{flex}$.

3. The method according to claim 2, wherein a plurality of retransmission protocol uplink feedback timings, for previous downlink transmissions received by the mobile station, is predefined for the plurality of static TDD configurations, one retransmission protocol uplink feedback timing per static TDD configuration, wherein at least one retransmission protocol uplink feedback timing, for previous downlink transmissions received by the mobile station, is predefined for the at least one flexible TDD configuration, one retransmission protocol uplink feedback timing per flexible TDD configuration, and wherein each of the at least one retransmission protocol uplink feedback timing for a flexible TDD configuration is the same as one out of the plurality of retransmission protocol feedback uplink timings for the static TDD configurations, such that the retransmission protocol uplink feedback is transmitted by the mobile station only in an uplink, downlink or special subframe.

4. The method according to claim 1, wherein the flexible TDD configuration is pre-configured in the mobile station and the base station, and the mobile station receives an identifier from the base station identifying the flexible TDD configuration to be used for communication, or wherein the mobile station, communicating based on a first static TDD configuration, receives an indication from the base station to use a flexible TDD configuration, and the mobile station determines the flexible TDD configuration to be used for communication based on the first static TDD configuration by determining at least one subframe $n_{flex}$ of the radio frame as a flexible subframe such that subframe $n_{flex}-1$ is a special subframe or an uplink subframe, and subframe $n_{flex}+1$ is a downlink subframe or a special subframe, and subframe n of the corresponding static TDD configuration is an uplink subframe, where $n=n_{flex}$.

5. The method according to claim 1, comprising:

determining by the mobile station and the base station the flexible subframe is to be used as an uplink subframe, in case an uplink transmission from the mobile station is pending for the flexible subframe, and determining by the mobile station and the base station the flexible subframe is to be used as a downlink subframe, in case no uplink transmission from the mobile station is pending for the flexible subframe.

6. The method according to claim 1, wherein the mobile station transmits a retransmission protocol uplink feedback to the base station for a flexible subframe which is determined to be used for uplink communication.

7. A mobile station for communicating with a base station in a communication system based on one out of at least one flexible Time Division Duplex (TDD) configuration, wherein each of the at least one flexible TDD configuration defines subframes of a radio frame as an uplink subframe, a downlink subframe, a special subframe or a flexible subframe, and defines at least one subframe $n_{flex}$ of the radio frame as a flexible subframe such that subframe $n_{flex}-1$ is a special subframe or an uplink subframe, and subframe $n_{flex}+1$ is a downlink subframe or a special subframe, wherein the flexible subframe is selectively usable as a downlink or uplink subframe, the mobile station comprising:

a receiver, which, in operation, receives control information for an uplink resource assignment, from the base station, in a subframe that assigns uplink resources in a flexible subframe; and processing circuitry, coupled to the receiver, which, in operation, determines the flexible subframe is to be used as an uplink subframe, in case a Cyclic Redundancy Check part of the control information for an uplink resource assignment is scrambled with one of: a Paging-Radio Network Temporary Identifier (RNTI), a System Information-RNTI, a Random Access-RNTI, a Multimedia Broadcast Multicast Service-RNTI, and a predefined flexible-TDD-RNTI, wherein the control information for an uplink resource assignment indicates an invalid value of uplink resources, the control information for an uplink resource assignment is a Downlink Control Information (DCI) Format 0 or 4, the control information for an uplink resource assignment is transmitted from the base station in resources of a common search space, and the control information for the uplink resource assignment indicates a predefined power control value for the uplink resource assignment.

8. The mobile station according to claim 7, wherein the communication with the base station is based either on one out of a plurality of static TDD configurations or on one out of the at least one flexible TDD configuration, wherein each of the static TDD configurations defines subframes of a radio frame as an uplink subframe, a downlink subframe or a special subframe, and wherein the at least one flexible TDD configuration defines the subframes of the radio frame as an uplink subframe, a downlink subframe or a special subframe the same as a corresponding static TDD configuration with the exception of further defining the at least one subframe nflex as a flexible subframe, wherein the at least one flexible TDD configuration defines the at least one subframe $n_{flex}$ as a flexible subframe such that subframe n of the corresponding static TDD configuration is an uplink subframe, where $n=n_{flex}$.

9. The mobile station according to claim 8, the mobile station communicating based on a first static TDD configuration, the mobile station comprising:

a memory adapted to store the plurality of static TDD configurations, wherein the receiver, in operation, receives an indication from the base station to use a flexible TDD configuration, and wherein the processing circuitry, in operation, determines, in response to the received indication, the flexible TDD configuration to be used for communication, based on the first static TDD configuration by determining at least one subframe $n_{flex}$ of the radio frame as a flexible subframe such that subframe $n_{flex}-1$ is a special subframe or an uplink subframe, and subframe $n_{flex}+1$ is a downlink subframe or a special subframe, and subframe n of the corresponding static TDD configuration is an uplink subframe, where $n=n_{flex}$.

10. The mobile station according to claim 7, the mobile station comprising:

a memory adapted to store the flexible TDD configuration, wherein the receiver, in operation, receives an identifier from the base station, identifying the flexible TDD configuration to be used for communication.

11. The mobile station according to claim 7, wherein the flexible TDD configuration defines at least one subframe of the radio frame as an uplink subframe.

12. The mobile station according to claim 7, wherein the at least one flexible TDD configuration corresponds to a static TDD configuration defining the most uplink subframes in a radio frame.

13. The mobile station according to claim 7, wherein the processing circuitry, in operation, determines the flexible subframe is to be used as an uplink subframe, in case an uplink transmission from the mobile station is pending for the flexible subframe, and determines the flexible subframe is to be used as a downlink subframe, in case no uplink transmission from the mobile station is pending for the flexible subframe.

14. The mobile station according to claim 7, wherein the processing circuitry, in operation, determines the flexible subframe is to be used as a downlink subframe, in case a Cyclic Redundancy Check part of control information for a downlink resource assignment is scrambled with one of: a Paging-Radio Network Temporary Identifier (RNTI), a System Information-RNTI, a Random Access-RNTI, a Multimedia Broadcast Multicast Service-RNTI, and a predefined flexible-TDD-RNTI.

15. The mobile station according to claim 7, wherein in case the processing circuitry of the mobile station determines the flexible subframe nflex of the radio frame is determined to be used as a downlink subframe and in case subframe n−1 of said radio frame is a special subframe, the processing circuitry determines that the special subframe n−1 of said radio frame is usable as a downlink subframe instead of as a special subframe.

16. The mobile station according to claim 7, wherein in case the mobile station communicates based on one of the at least one flexible TDD configuration, a transmitter of the mobile station, in operation, transmits a retransmission protocol uplink feedback, for previous downlink transmissions received by the mobile station, in a flexible subframe.

17. A base station for communicating with a mobile station in a communication system based on one out of at least one flexible Time Division Duplex (TDD) configuration, wherein each of the at least one flexible TDD configuration defines subframes of a radio frame as an uplink subframe, a downlink subframe, a special subframe or a flexible subframe, and defines at least one subframe $n_{flex}$ of the radio frame as a flexible subframe such that subframe $n_{flex}-1$ is a special subframe or an uplink subframe, and subframe $n_{flex}+1$ is a downlink subframe or a special subframe, wherein the flexible subframe is selectively usable as a downlink or uplink subframe, the base station comprising:

a transmitter, which, in operation, transmits control information for an uplink resource assignment, to the mobile station, in a subframe that assigns uplink resources in a flexible subframe; and processing circuitry, coupled to the transmitter, which, in operation, determines the flexible subframe is to be used as an uplink subframe, in case a Cyclic Redundancy Check part of the control information for an uplink resource assignment is scrambled with one of: a Paging-Radio Network Temporary Identifier (RNTI), a System Information-RNTI, a Random Access-RNTI, a Multimedia Broadcast Multicast Service-RNTI, and a predefined flexible-TDD-RNTI, wherein the control information for an uplink resource assignment indicates an invalid value of uplink resources, the control information for an uplink resource assignment is a Downlink Control Information (DCI) Format 0 or 4, the control information for an uplink resource assignment is transmitted from the base station in resources of a common search space, and the control information for the uplink resource assignment indicates a predefined power control value for the uplink resource assignment.

18. The base station according to claim 17, wherein the communication with the mobile station is based either on one out of a plurality of static TDD configurations or on one out of the at least one flexible TDD configuration, wherein each of the static TDD configurations defines subframes of a radio frame as an uplink subframe, a downlink subframe or a special subframe, and wherein the at least one flexible TDD configuration defines the subframes of the radio frame as an uplink subframe, a downlink subframe or a special subframe the same as a corresponding static TDD configuration with the exception of further defining the at least one subframe $n_{flex}$ as a flexible subframe, wherein the at least one flexible TDD configuration defines the at least one subframe $n_{flex}$ as a flexible subframe such that subframe n of the corresponding static TDD configuration is an uplink subframe, where $n=n_{flex}$.

* * * * *

UNITED STATES PATENT AND TRADEMARK OFFICE
CERTIFICATE OF CORRECTION

PATENT NO.       : 9,768,942 B2                                    Page 1 of 1
APPLICATION NO.  : 14/888333
DATED            : September 19, 2017
INVENTOR(S)      : Alexander Golitschek Edler von Elbwart et al.

It is certified that error appears in the above-identified patent and that said Letters Patent is hereby corrected as shown below:

In the Specification

Column 46, Line 6:
"determines the flexible subframe nflex of the radio frame is"
Should read:
--determines the flexible subframe $n_{flex}$ of the radio frame is--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*